US008254187B2

(12) United States Patent
Tanaka

(10) Patent No.: US 8,254,187 B2
(45) Date of Patent: Aug. 28, 2012

(54) DATA TRANSFER APPARATUS, AND METHOD, AND SEMICONDUCTOR CIRCUIT

(75) Inventor: Katsunori Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 207 days.

(21) Appl. No.: 12/866,225

(22) PCT Filed: Mar. 6, 2009

(86) PCT No.: PCT/JP2009/054267
§ 371 (c)(1),
(2), (4) Date: Aug. 4, 2010

(87) PCT Pub. No.: WO2009/110588
PCT Pub. Date: Sep. 11, 2009

(65) Prior Publication Data
US 2010/0315886 A1 Dec. 16, 2010

(30) Foreign Application Priority Data

Mar. 6, 2008 (JP) ................................ 2008-056881

(51) Int. Cl.
*G11C 7/00* (2006.01)
(52) U.S. Cl. .............................. 365/189.17; 365/189.18
(58) Field of Classification Search ............. 365/189.17, 365/189.02
See application file for complete search history.

(56) References Cited

U.S. PATENT DOCUMENTS
6,898,233 B2 * 5/2005 Philips et al. ................. 375/130

FOREIGN PATENT DOCUMENTS
| JP | 5-81189 A | 4/1993 |
| JP | 6-78019 A | 3/1994 |
| JP | 9-93134 A | 4/1997 |
| JP | 2003271550 A | 2/2003 |
| JP | 3892323 B | 3/2007 |

OTHER PUBLICATIONS

International Search Report for PCT/JP2009/054267 mailed Jun. 15, 2009.
S. B. Furber et al., "Four-Phase Micropipeline Latch Control Circuits", IEEE Transaction on Very Large Scale Integration (VLSI) Systems, vol. 4, No. 2, Jun. 1996, pp. 247-253.
K.Y. Yun et al., "High Performance Asynchronous Pipeline Circuits", IEEE Int'l Symposium on Advanced Research on Asynchronous Circuits and Systems, Mar. 1996, pp. 17-28.
J. Sparso et al., "Principles of Asynchronous Circuit Design—A Systems Perspective", Chapter 5, Handshake Circuit Implementations, Kluwer Academic Publishers, Dec. 2001, pp. 57-80.

* cited by examiner

*Primary Examiner* — Vu Le

(57) ABSTRACT

Provided is a data transfer apparatus and method that enables fast data transfer, and has a simple circuit configuration and a small area; and a semiconductor circuit. The data transfer apparatus includes: a data pair generation circuit (301) that transfers a generated data pair during one cycle of a handshake signal communication; a multiplexer (302) that outputs one of the data pair in accordance with a handshake signal; a memory (305) that stores the data output from the multiplexer (302) in response to bi-directional transition of the memory control input signal; a memory control circuit (303) that performs a handshake signal communication and outputs the memory control signal; a request signal waiting circuit (306) that waits until one of the data pair is stored in the memory (305) and the other data is output from the multiplexer (302); and a data pair receiving circuit (307) that receives the data pair in response to a signal from the request signal waiting circuit (306) and outputs the data pair to the transfer destination.

20 Claims, 17 Drawing Sheets

DATA TRANSFER APPARATUS, AND METHOD, AND SEMICONDUCTOR CIRCUIT

This application is the National Phase of PCT/JP2009/054267, filed Mar. 6, 2009, which is based upon and claims the benefit of priority from Japanese patent application No. 2008-056881, filed on Mar. 6, 2008, the disclosure of which is incorporated herein in its entirety by reference.

TECHNICAL FIELD

The present invention relates to a data transfer in an electronic circuit such as an integrated circuit (chip).

BACKGROUND ART

As a miniaturization technology of an integrated circuit progresses, the number of elements that can be implemented on one chip increases.

Previously, a circuit design using a synchronous method that distributes a synchronous signal called a clock throughout a chip and concurrently drives elements on the chip at clock edges was predominant.

However, as the number of the elements increases, a ratio of delay time of a signal that flows between the elements on the circuit (chip) to clock cycle time becomes greater. Therefore, it is difficult to cause the clock edges to arrive at all elements at the same time.

There is proposed a method that divides a system implemented on a chip into a plurality of functional blocks according to functions, and restricts an area where the clock edges are caused to arrive at the same time to the elements that are included in each functional block, thereby arbitrarily setting a timing at which the clock arrives at the elements between the functional blocks (in other words, an arrival timing of the clock edges is set as desired between different functional blocks and the clock edges are cause to arrive simultaneously at the elements that are included in the same functional block).

This is a circuit design method called Globally Asynchronous, Locally Synchronous (GALS) method.

Recently, the Globally Asynchronous, Locally Synchronous method mentioned above is becoming a main circuit design method.

When a circuit is designed using the GALS method, an asynchronous logic circuit is used as a circuit for data communication between functional blocks. The asynchronous logic circuit is a logic circuit that operates by making registers of a transfer source and a transfer destination to operate cooperatively between registers that perform data transfer using a handshake signal instead of using a clock.

A pair of a request signal and an acknowledgment signal is used as the handshake signal. A memory request signal of data is transferred from a transfer source register to a transfer destination register with data.

When no untransferred data remains in the transfer destination register upon receiving a data storage request, the transfer destination register stores the arrived data and transfers a storage completion acknowledgment indicating that the storage of the arrived data has been completed, to the transfer source register. On the other hand, when untransferred data remains in the transfer destination register, the transfer destination register waits without transferring the storage completion acknowledgment to the transfer source register until the transfer of the untransferred data is completed.

The transfer source register regards the stored data as having been transferred and prepares for a next data transfer upon receiving the storage completion acknowledgment from the transfer destination register.

Thus, it is possible for the asynchronous logic circuit to notify congestion on a data transfer route in the direction of the origin by using the handshake signal. Therefore, the functional blocks each of which is operated by the asynchronous clock can be made to operate cooperatively by receiving the congestion acknowledgment at the functional block that is the origin of the data transfer and suspending the transfer.

There are four-phase type and two-phase type handshake signal communication methods for an asynchronous logic circuit.

The four-phase type handshake signal communication is performed by sending the data memory request and the storage completion acknowledgment as voltage levels of a memory signal and an acknowledgment signal. When both the request signal and the acknowledgment signal between two registers that send and receive the data in the asynchronous logic circuit are in a low-voltage condition, the data memory request is sent when the request signal is brought into a high-voltage condition, and the storage completion acknowledgment is sent when the acknowledgment signal is brought into the high-voltage condition.

In the four-phase type handshake signal communication, both the request signal and the acknowledgment signal are restored to the low-voltage condition after the data transfer prior to the next data transfer.

The two-phase type handshake signal communication is performed by sending the data memory request and the storage completion acknowledgment as transitions of the memory signal and the acknowledgment signal. When both the request signal and the acknowledgment signal between two registers that send and receive the data in the asynchronous logic circuit are in the low-voltage condition, the data memory request at a first data communication is sent by a rising edge transition of the request signal, and the storage completion acknowledgment is sent by a rising edge transition of the acknowledgment signal.

As a result, the request signal and the acknowledgment signal are brought into the high-voltage condition by the first data communication. When a second data communication is performed from the condition, the data memory request is sent by a falling edge transition of the request signal, and the storage completion acknowledgment is sent by a falling edge transition of the acknowledgment signal.

Comparing the transfer speeds, the two-phase type has an advantage of higher speed over the four-phase type. This is because the four-phase type needs two reciprocating handshake signal communications to complete one data transfer, but the two-phase type needs only one reciprocating communication.

Therefore, the two-phase type can achieve the data transfer speed two times faster than that of the four-phase type in theory.

On the other hand, comparing the circuit configurations, the four-phase type has an advantage of a simpler configuration over the two-phase type. The four-phase type can use a level sensitive latch and a flip-flop that operates at one of a rising edge transition and a falling edge transition of a control signal, as a memory element used for a register. Therefore, the asynchronous logic circuit for the four-phase type handshake signal communication can be configured only by logic cells that have recently been widely used.

On the other hand, it is necessary for the asynchronous logic circuit for the two-phase type handshake signal communication to be configured with a flip-flop that operates in both directions of the control signal transitions as described in Non-Patent Document 1, or with an element that alternately changes two output signals according to the transitions in both directions of the control signal, as well as a level sensitive latch and a flip-flop that operates at one of the control signal transitions as described in Non-Patent Document 2.

However, most of the flip-flops that operate due to the both directions of the control signal transitions and the element that alternately changes two output signals according to the both directions of the control signal transitions are not prepared in a logic cell library. Therefore, it is practically almost impossible to design the asynchronous logic circuit that controls the two-phase type handshake signal communication.

Not only the register but also an asynchronous functional block that is necessary for the design of the asynchronous logic circuit that connects synchronous functional blocks in the circuit using the GALS method has a simply configuration in the four-phase type compared with the two-phase type.

As an example of the asynchronous functional block that is necessary for the design of the asynchronous logic circuit that connects the synchronous functional blocks, there is an arbitration circuit that arbitrates a plurality of input request signals and outputs one of the request signals.

FIG. 1 shows a configuration of a regulator circuit for the four-phase type handshake signal communication described in Non-Patent Document 3. Request signals Ri0, Ri1 and an acknowledgment signal Ao are supplied to an arbitration circuit 100. Acknowledgment signals Ai0, Ai1, a request signal Ro, and arbitration result signals Gr0, Gr1 are output from the arbitration circuit 100. The arbitration circuit 100 includes a mutual exclusion module 110, a preceding handshake completion module 120, an output request signal generation module 130, and an output acknowledgment signal generation module 140. The mutual exclusion module 110 includes a first-arrival signal selection module 111 and a wrong signal propagation prevention module 112.

Each module in the arbitration circuit 100 includes a typical combinational logic cell and a feedback loop.

A Muller's C element that configures the output acknowledgment signal generation module 140 is a state memory element that waits for two input signals. If conditions are satisfied, the element changes the output signal. If conditions are not satisfied, the element does not change but maintains the output signal.

A Muller's C element 200 shown in FIG. 2(*a*) has input terminals A, B and an output terminal Y.

The Muller's C element 200 operates so as to output Y=0 when the input signals are A=0 and B=0, and output Y=1 when the input signals are A=1 and B=1. Further, the Muller's C element 200 does not change but maintains the output signal when the input signals are A=0 and B=1 or A=1 and B=0.

For example, assume that the Muller's C element 200 is supplied with the input signals A=1 and B=1 and that the output signal is Y=1. Then, even though one of the input signals A and B changes and the input signals become A=0 and B=1 or A=1 and B=0, the output signal is maintained as Y=1. Further, also when the Muller's C element 200 is supplied with the input signals A=0 and B=0 and the output signal is Y=0, even though one of the input signals A and B changes and the input signals become A=1 and B=0 or A=0 and B=1, the output signal is maintained as Y=0.

Thus, the Muller's C element 200 outputs different values in accordance with a value obtained immediately before the combination of the signals supplied, even though the same combination of the input signals A=0 and B=1 is given.

Relations between the input signals and the output signals of the Muller's C element 200 are shown in FIG. 2(*b*). Here, Y (t−1) indicates a value of an output signal Y before one of the input signals A and B changes. If one of the input signals A and B changes from the state where the input signals are A=0 and B=0, Y (t−1) becomes "0". If one of the input signals A and B changes from the state where the input signals are A=1 and B=1, Y (t−1) becomes "1".

The Muller's C element 200 performs a crucial function in the asynchronous logic circuit by the waiting function and the state storage function.

For example, the output acknowledgment signal generation module 140 in the arbitration circuit 100 shown in FIG. 1 includes two Muller's C elements. The output acknowledgment signals Ai0 and Ai1 of the arbitration circuit 100 are generated as follows by the arbitration result signals Gr0 and Gr1 and the input acknowledgment signal Ao.

If Gr0=1 and Ao=1, then Ai0=1.
If Gr1=1 and Ao=1, then Ai1=1.
If Gr0=0 and Ao=0, then Ai0=0.
If Gr1=0 and Ao=0, then Ai1=0.

The restriction that the output acknowledgment signals Ai0 and Ai1 cannot be changed until the condition as well as the above conditions are satisfied is imposed, upon generating the output acknowledgment signals Ai0 and Ai1 of the arbitration circuit 100. The Muller's C elements are used in the output acknowledgment signal generation module 140 to achieve such an operation.

The reason why the arbitration circuit that performs the four-phase type handshake has the simple configuration as shown FIG. 1 is that there is no need for the four-phase arbitration circuit to be configured to store conditions of the handshake communication because the memory request and the completion acknowledgment are sent as the voltage levels.

For example, assume that the request signal Ri0 has arrived earlier than the other request signal Ri1. The request signals in the four-phase type are sent as signal levels Ri0=1 and Ri1=1, respectively. The four-phase arbitration circuit 110 can hold the signal level of the request signal Ri1=1 that has arrived later, and keep waiting for completion of the handshake by the other request signal Ri0=1. This is because it is possible to indicate that the processing corresponding to the request signal is not completed only by the signal level of Ri1=1.

On the other hand, in the two-phase type, the state of the handshake communication is unclear only by the voltage level because the storage request and the completion acknowledgment are sent as a signal transition of the handshake signal.

For example, assume that the request signal levels are changed from Ri0=Ri1=0 to Ri0=1, Ri1=1 in order. If the request at the rising edge of the request signal Ri0 that has arrived earlier is immediately started to be processed, Ri1 is maintained as Ri1=1 until the handshake signal communication at the rising edge of the signal Ri0 is completed.

However, in the two-phase type, it is impossible to indicate that the handshake communication at the rising edge of the request signal Ri1 is not started, because the handshake communication at the rising edge of the request signal Ri1 may have already been started only in the case where the signal state is Ri1=1.

Therefore, the two-phase type arbitration circuit has to store information indicating that the request at the rising edge of the request signal Ri1 that has arrived later is not processed.

The configuration of the two-phase type arbitration circuit becomes extremely complex because the storage of information indicating that the request by the signal transition of Ri1 is not processed must be caused not only by the signal transitions of both the rising edge and the falling edge of Ri1 but also by the signal transitions of both the rising edge and the falling edge of the input acknowledgment signal Ao. Therefore, the configuration of the two-phase type arbitration circuit is much larger than that of the four-phase arbitration circuit.

The technique that may achieve both the simplicity of the four-phase type circuit and the high-speed performance of the two-phase type is disclosed in Patent Document 1.
[Patent Document 1]
Japanese Patent No. 3892323
[Non-Patent Document 1]
S. Furber et al, "Four-phase Micro-pipeline Latch Control Circuits," IEEE Transaction on VLSI Systems, Vol. 4, No. 2, pp. 247-253, June, 1996.
[Non-Patent Document 2]
K. Y. Yun et al, "High-Performance Asynchronous Pipeline Circuits," IEEE Int'l Symposium on Advanced Research on Asynchronous Circuits and Systems, pp. 17-28, March, 1996.
[Non-Patent Document 3]
Jens Sparso and S. Furber, "Principles of Asynchronous Circuit Design: A Systems Perspective," Kluwer Academic Publishers, pp. 57-80, December, 2001.

DISCLOSURE OF INVENTION

Technical Problem

However, the circuit disclosed in Patent Document 1 cannot achieve the high-speed performance and the simplicity of the circuit because the circuit disclosed in Patent Document 1 converts between the four-phase type handshake communication and the two-phase type handshake communication and it requires many conversion circuits to design the asynchronous logic circuit that connects the synchronous function blocks.

As described above, the asynchronous logic circuit has the problems as follows:

(1) An asynchronous data transfer circuit that performs the four-phase type handshake communication cannot transfer data at high speed because two reciprocating handshake signal communications are needed to accomplish one data transfer.

(2) An asynchronous data transfer circuit that performs the two-phase type handshake communication needs a configuration that stores an operation state because the voltage level does not indicate the operating state in the handshake communication. This makes the circuit configuration complicated.

(3) The asynchronous data transfer circuit that performs the two-phase type handshake communication needs a memory element that performs a storage operation responsive to transitions of both the rising edge and the falling edge of the memory control signal. This increases the circuit area.

The present invention has been made to solve the problems and has an object to provide a data transfer apparatus, and method, and a semiconductor circuit that can transfer data at high speed and have a simple circuit configuration and a small area.

Technical Solution

To achieve the above-mentioned object, a first exemplary aspect of the present invention is a data transfer apparatus that performs data transfer from one or more transfer sources to one or more transfer destinations includes: a data pair generation circuit that generates a data pair by making the number of transfer data items even by adding an odd number of dummy data items to the data items and pairing the even number of transfer data items, when the number of data items that are requested to transfer is odd, and outputs the generated data pair in accordance with a communication period of a handshake signal; a multiplexer that outputs one of the data pair in response to the handshake signal; a memory that stores the data output from the multiplexer in response to transitions of both a rising edge and a falling edge of a memory control input signal; a memory control circuit that performs a handshake signal communication based on a four-phase type handshake protocol and outputs a memory control signal to control the memory; a waiting circuit that outputs a request signal on condition that one of the data pair is stored in the memory and the other data is output from the multiplexer; and a data pair receiving circuit that receives the data pair from the multiplexer and the memory in response to the request signal and outputs the received data pair to the transfer destination.

To achieve the above-mentioned object, a second exemplary aspect of the present invention is a semiconductor circuit that includes the data transfer apparatus according to the above-mentioned first exemplary aspect of the present invention.

Further, to achieve the above mentioned object, a third exemplary aspect of the present invention is a data transfer apparatus that performs a data transfer from one or more transfer sources to one or more transfer destinations, a data transfer method includes: making the number of transfer data items even by adding an odd number of dummy data items to the data when the number of data items that are requested to transfer is odd; generating a data pair by pairing the even number of transfer data items; outputting one of the generated data pair from a multiplexer in accordance with a communication period of a handshake signal; storing the data to a memory in response to transitions both a rising edge and a falling edge of a memory control input signal, the data being output in accordance with the communication period of the handshake signal; performing a handshake signal communication based on a four-phase type handshake protocol and outputting a memory control signal to control the memory; outputting a request signal on condition that one of the data pair is stored at the memory and the other data is output from the multiplexer; and receiving the data pair from the multiplexer and the memory in response to the request signal and outputting the received data pair to the transfer destination.

Advantageous Effects

According to the present invention, it is possible to provide a data transfer apparatus, and method, and a semiconductor circuit that can transfer data at high speed and have a simple circuit configuration and a small area.

BEST MODE FOR CARRYING OUT THE INVENTION

First Exemplary Embodiment

An internal constitution of a data transfer apparatus according to a first exemplary embodiment of the present invention is shown in FIG. 3. A data transfer apparatus 300 includes a data pair generation circuit 301, a multiplexer 302, a memory control circuit 303, a pulse signal generation circuit 304, a memory 305, a request signal waiting circuit 306, and a data pair receiving circuit 307.

The data pair generation circuit 301 adds an odd number (e.g., one) of dummy data items and makes the number of hold data items even upon holding an odd number of unsent data at the timing when the data pair generation circuit 301 externally receives a data string including one or more input data items. Note that the number of dummy data items may be an arbitrary odd number, but it is preferable to add only one data item to prevent an unnecessary data transfer. The data pair generation circuit 301 outputs first data and next data in the data string as a data pair from a first data output terminal and a second data output terminal, respectively. Further, the data pair generation circuit 301 repeatedly outputs an internal request signal Rm corresponding to the data pair until all of the input data items are sent. Assume herein that the internal request signal Rm is a signal that has two kinds of voltage state. The data pair generation circuit 301 can be configured as a sequential logic circuit that changes the states by the externally input signal.

The multiplexer 302 propagates a signal from a first data output terminal Dp as the output of the data pair generation circuit 301 when the internal request signal Rm supplied from the data pair generation circuit 301 is in one voltage state. The multiplexer 302 propagates a signal from a second data output terminal Dn as the output of the data pair generation circuit 301 when the internal request signal Rm supplied from the data pair generation circuit 301 is in the other voltage state. The multiplexer 302 can be configured as a combinational logic circuit that outputs one of the two data input values according to the state of a one-bit selection signal.

The memory control circuit 303 receives the internal request signal Rm from the data pair generation circuit 301 and an acknowledgment signal Ar from the data pair receiving circuit 307. The memory control circuit 303 outputs a control signal Lt to the memory 305, an internal acknowledgment signal Am to the data pair generation circuit 301, and a request signal Rr to the data pair receiving circuit 307, according to a four-phase type handshake protocol. The memory control circuit 303 can be configured as shown in FIG. 4(a) by a Muller's C element 601 similar to that as shown FIG. 2 and a NOT gate. Note that, as shown in FIG. 4(b), the Muller's C element 601 can be configured by a 3-input majority decision cell 601a and a feedback loop 601b.

The pulse signal generation circuit 304 receives the control signal Lt for the memory 305 from the memory control circuit 303 and generates a pulse signal P at the rising transition and the falling transition of the control signal. The pulse signal P is the pulse the time of which is shorter than a minimum delay of the acknowledgment signal Am and the request signal Rm between the memory control circuit 303 and the data pair generation circuit 301 and a minimum delay of the request signal Rr to the request signal waiting circuit 306 and the acknowledgment signal Ar from the data pair receiving circuit 307. The pulse signal generation circuit 304 can be configured by an EXCLUSIVE-OR gate and a delay gate, as shown in FIG. 5.

The memory 305 receives the pulse signal P from the pulse signal generation circuit 304, stores a data output signal Dm from the multiplexer 302, and outputs data Dr to the data pair receiving circuit 307. The memory 305 can be configured by a number of memory elements corresponding to the bit width of the transfer data. At least one of a level sensitive latch and a flip-flop that operate responsive to one of the rising transition and the falling transition of the control signal can be applied as the memory element. The memory device using the level sensitive latch can achieve smaller device area because it can be configured by a smaller number of transistors compared to the storage device using the flip-flop. On the other hand, the memory device using the flip-flop facilitates a timing design because the setting of the pulse width for operating at one of the rising transition and the falling transition of the control signal is more flexible than that of the level sensitive latch.

The request signal waiting circuit 306 waits for the request signal Rr supplied from memory control circuit 303 and the negation of the internal request signal Rm supplied to the memory control circuit 303 that outputs the request signal Rr, and outputs a waiting request signal Rf. The request signal waiting circuit 306 can be configured by an AND gate and a NOT gate.

The data pair receiving circuit 307 receives the output signal from the request signal waiting circuit 306 and receives the data stored in the memory 305 and the data supplied to the memory 305 as the data pair, and outputs to the outside of the data transfer apparatus 300. The data pair receiving circuit 307 can be configured as a sequential logic circuit that changes the states by the externally input signal.

The flow of the operation of the data transfer apparatus 300 is shown in FIG. 6.

First, the data pair generation circuit 301 receives the send data from the outside of the data transfer apparatus 300 (Step S401). The data pair generation circuit 301 repeatedly receives the send data until a predetermined time elapses, and stores the received send data as a data string (Step S402).

The data pair generation circuit 301 judges whether the number of the send data items that are sent from the outside is even or not (Step S403) at the timing when the predetermined time has elapsed (Step S402/Yes). If the number of the received send data items is odd (Step S403/No), the data pair generation circuit 301 adds an odd number of dummy data to the end of the received data string (Step S404). On the other hand, if the number of the received send data items is even (Step S403/Yes), the data pair generation circuit 301 does not add the dummy data.

Then, the data pair generation circuit 301 outputs the internal request signal (Rm=1) with the data pair that includes the first two data items of the data string to the multiplexer 302, the memory control circuit 303, and the request signal waiting circuit 306 (Step S410).

The multiplexer 302 receives the first two data items of the data string and the internal request signal (Rm=1) that are output from the data pair generation circuit 301, and outputs the former (odd-numbered in the data string) data (the data Dp output from the first data output terminal of the data pair generation circuit 301) of the data pair as the send data Dm (Step S411).

If the memory control circuit 303 has received the acknowledgment signal Ar=0 at the timing of receiving the internal request signal Rm=1 from the data pair generation circuit 301 (Step S412/Yes), the memory control circuit 303 outputs the request signal Rr=1 to the request signal waiting circuit 306, the internal acknowledgment signal Am=1 to the data pair generation circuit 301, and the memory control signal Lt=1 to the pulse signal generation circuit 304 (Step S413). If the acknowledgment signal is Ar=1 at the timing of receiving the internal request signal Rm=1 from the data pair generation circuit 301, because the process that picks up previous processing data from the memory 305 has not completed, the memory control circuit 303 waits until the data is picked up by the data pair receiving circuit 307 and Ar=0 is supplied from the data pair receiving circuit 307 (Step S412).

The pulse signal generation circuit 304 generates the memory control pulse signal P responsive to the rising transition of the memory control signal Lt at Step S413 (Step S414).

The memory 305 stores the send data Dm (odd-numbered data) output from the multiplexer 302 at Step S411 when the pulse signal P that is generated at Step S414 is supplied from the pulse signal generation circuit 304 (Step S415).

The data pair generation circuit 301 outputs Rm=0 to the multiplexer 302, the memory control circuit 303, and the request signal waiting circuit 306 with the data pair output maintained, upon receiving the internal acknowledgment signal Am=1 (Step S420).

The multiplexer 302 receives the internal request signal Rm=0 with the data pair that is output by the data pair generation circuit 301, and outputs latter (even-numbered in the data string) data (the data Dn output from the second data output terminal of the data pair generation circuit 301) of the data pair as the send data Dm (Step S421).

The request signal waiting circuit 306 waits for the request signal Rr=1 and the internal request signal Rm=0, and outputs the waiting request signal Rf=1 to the data pair receiving circuit 307 (Step S422).

The data pair receiving circuit 307 receives the data pair from the memory 305 and the multiplexer 302 and outputs the acknowledgment signal Ar=1 to the memory control circuit 303, upon receiving the waiting request signal Rf=1 (Step S423). At first, the data pair receiving circuit 307 that has received the data pair outputs the odd-numbered data of the data pair as data output Do (Step S424). Then, the data pair receiving circuit 307 outputs the even-numbered data of the data pair as the data output Do (Step S425).

The memory control circuit 303 outputs the request signal Rr=0 to the request signal waiting circuit 306, the internal acknowledgment signal Am=0 to the data pair generation circuit 301, and the memory control signal Lt=0 to the pulse signal generation circuit 304, upon receiving the acknowledgment signal Ar=1 (Step S426). The request signal waiting circuit 306 outputs the waiting request signal Rf=0 to the data pair receiving circuit 307 in response to the transition of the request signal to Rr=0.

The pulse signal generation circuit 304 generates the pulse signal P for the memory control in response to the falling transition of the memory control signal Lt at Step S426 (Step S427).

The memory 305 stores the even-numbered data (the data Dn output from the second data output terminal of the data pair generation circuit 301) output from the multiplexer 302, upon receiving the pulse signal P from the pulse signal generation circuit 304 (Step S428). Then, the data pair receiving circuit 307 outputs the acknowledgment signal Ar=0 upon receiving the waiting request signal Rf=0 from the request signal waiting circuit 306 (Step S429).

Then, the data pair generation circuit 301 judges whether the output of the whole data string obtained up to Step S410 has been completed or not (Step S430). If the data pair generation circuit 301 has completed the output of the whole data string (Step S430/Yes), the process returns to Step S401. On the other hand, if the data pair generation circuit 301 has not completed the output of the whole data string (Step S430/No), the process returns to Step S410 to repeat the operations from Steps S410 to S429.

Note that the operations from Steps S427 and S428 (the operations involving the storage of the even-numbered data to the memory 305) of the above operations can be omitted. However, if these operations are omitted, the circuit configuration of the data transfer apparatus becomes complex because different processings are performed for the odd-numbered data and the even-numbered data. The circuit configuration for performing the operations of Steps S426 to S429 makes it possible to achieve the data transfer with a simple circuit configuration as shown in FIG. 3.

Some steps described in the flow chart shown in FIG. 6 can be processed in parallel.

The operations of each part of the data transfer apparatus 300 are shown in FIGS. 7 to 10. The operations of each part shown in FIGS. 7 to 10 can be processed in parallel.

Each part of the data transfer apparatus 300 operates by waiting for input signals from other functional parts. The operation illustrated in FIG. 6 is an exemplary combination of the operations of each part shown in FIGS. 7 to 10.

The operational flow of the data pair generation circuit 301 is shown in FIG. 7. The data pair generation circuit 301 performs two operations: "data receiving processing" that acquires data from the transfer source, and "data transfer processing" that outputs the data to the transfer destination. Steps S1201 to S1203 correspond to Steps S401 and S402 in FIG. 6. Steps S1203 to S1205 correspond to Steps S403 and S404 in FIG. 6. Step S1206 corresponds to the step of waiting for execution at Step S426 in FIG. 6. Step S1207 corresponds to Step S411 in FIG. 6. Step S1208 corresponds to the step of waiting for execution at Step S413 in FIG. 6. Steps S1209 and S1210 correspond to Steps S420 and S430 in FIG. 6, respectively. Note that "data receiving processing" and "data transfer processing" may be performed in parallel or in serial.

The operational flow of the multiplexer 302 is shown in FIG. 8. Step S1301 corresponds to Step S410 and S420 in FIG. 6 and is a conditional branch that indicates which step is performed in these steps. Step S1302 corresponds to Step S410, and the multiplexer 302 receives the odd-numbered data of a new data pair output from the data pair generation circuit 301 as an input. Step S1303 corresponds to Step S420, and the multiplexer 302 receives the even-numbered data of the data pair, the output of which is maintained by the data pair generation circuit 301, as an input. Step S1304 corresponds to Steps S411 and S421, and the multiplexer 302 outputs the data supplied at Step S1302 or S1303.

The operational flow of each of the memory control circuit 303, the pulse signal generation circuit 304, and the memory 305 is shown in FIG. 9. Step S1401 is the operation of the memory control circuit 303 in the case where Step S410 is executed by the data pair generation circuit 301 and the condition is true at the conditional branch of Step S412. Step S1402 is the operation of the memory control circuit 303 corresponding to Step S413. Step S1403 is the operation of the pulse signal generation circuit 304 corresponding to Step S414. Step S1404 is the operation of the memory 305 corresponding to Step S415. Step S1405 is the operation of the memory control circuit 303 in the case where Step S420 is executed by the data pair generation circuit 301 and Step S422 is executed by the data pair receiving circuit 307. Step S1406 is the operation of the memory control circuit 303 corresponding to Step S426. Step S1407 is the operation of the pulse signal generation circuit 304 corresponding to Step S427. Step S1408 is the operation of the memory 305 corresponding to Step S428.

The operational flow of the request signal waiting circuit 306 and the data pair receiving circuit 307 is shown in FIG. 10. Step S1501 is the operation of the request signal waiting circuit 306 corresponding to the conditional branch of Step S422. Steps S1502 to S1505 are the operations of the data pair receiving circuit 307 corresponding to Steps S423 to S425, respectively. Step S1506 is a conditional branch for judging whether Step S426 has been executed or not by the memory control circuit 303, and the data pair receiving circuit 307 waits until the request signal comes to Rr=0. Step S1508 is the operation of the data pair receiving circuit 307 corresponding to Step S429.

It is possible to indicate the entire operation of the data transfer apparatus 300 by combining the operations of each part shown in FIGS. 7 to 10 described above.

As described above, the data transfer apparatus according to this exemplary embodiment is configured to generate a data pair including two data items by the data pair generation circuit 301, transfer the two data items in order during one period of the four-phase type handshake protocol by the multiplexer 302, and drives the memory 305 twice during one period of the four-phase type handshake protocol by the pulse signal generation circuit 304. Therefore, the data transfer apparatus according to this exemplary embodiment can achieve a transfer speed twice as high as that of the conventional four-phase type data transfer apparatus.

Further, in this exemplary embodiment, the number of data items that are actually transferred is made even by adding the dummy data in the case where the number of data items that are supplied to the data pair generation circuit 301 by the predetermined time is odd. Therefore, it is possible to perform the transfer in one period of the four-phase type handshake protocol as an indivisible unit. Thus, the data transfer apparatus according to this exemplary embodiment can achieve the four-phase handshake control circuit with a simple circuit configuration.

Further, in this exemplary embodiment, pulses are generated at both transitions of the memory control signal by the pulse signal generation circuit 304. Therefore, a latch and a flip-flop that operate at one of the transitions of the memory control signal can be applied as the memory 305. This makes it possible to reduce the circuit area of the memory 305.

Note that an exemplary configuration provided with the pulse signal generation circuit 304 is described by way of example. However, as shown in FIG. 11, the pulse signal generation circuit 304 that is located at the preceding stage of the data pair receiving circuit 307 can be omitted.

Second Exemplary Embodiment

A second exemplary embodiment that preferably practices the present invention is described.

In the first exemplary embodiment mentioned above, the simplest configuration having one input and one output is described. However, the present invention can also be applied to configurations in which the number of inputs and the number of outputs are not one.

If the number of inputs and the number of outputs are not one, circuits for diverging and converging are provided in the data transfer apparatus. Examples of the circuits for diverging and converging include a four-phase arbitration circuit, a four-phase waiting circuit, a four-phase distribution circuit, and a four-phase selection circuit.

The four-phase arbitration circuit is a circuit for sending two or more input signals to a next stage one by one in order. The arbitration circuit 100 shown in FIG. 1 can be applied as the four-phase arbitration circuit. Note that a plurality of four-phase arbitration circuits each of which has two inputs and one output may be arranged in series to send three or more input signals to the next stage in order. For example, when three input signals A, B, and C are arbitrated, the former four-phase arbitration circuit may arbitrate A and B and output a first arrival signal as an arbitration result D, and the latter four-phase arbitration circuit may arbitrate D and C and output a first arrival signal as an arbitration result.

The four-phase selection circuit is a circuit for selectively outputting input data to one of a plurality of output destination candidates, the input data being supplied to data signal lines provided in parallel. The four-phase selection circuit includes a request signal input terminal, a plurality of request signal output terminals, an acknowledgment signal output terminal, acknowledgment signal input terminals as many as the request signal output terminals, and destination information input terminals. The four-phase selection circuit selects one of the request signal output terminals based on destination information and outputs the request signal from the selected terminal, upon receiving the request signal from the request signal input terminal. Further, the four-phase selection circuit receives the acknowledgment signal corresponding to the output request signal through the acknowledgment signal input terminal corresponding to the selected request signal output terminal and outputs the acknowledgment signal from the acknowledgment signal output terminal.

An exemplary configuration of the four-phase selection circuit is shown in FIG. 12. The four-phase selection circuit shown in the figure includes a request signal input terminal Ri, request signal output terminals Ro0, Ro1, an acknowledgment signal output terminal Ai, acknowledgment signal input terminals Ao0, Ao1, and destination information input terminals S0, S1. The four-phase selection circuit selects one of the request signal output terminals Ro0, Ro1 based on the destination information and outputs the request signal from the selected terminal, upon receiving the request signal from the request signal input terminal Ri. Further, the four-phase selection circuit receives the acknowledgment signal corresponding to the output request signal through the acknowledgment signal input terminals Ao0, Ao1 corresponding to the selected request signal output terminal and outputs the acknowledgment signal from the acknowledgment signal output terminal Ai.

An exemplary operation of the four-phase selection circuit shown in FIG. 12 is described. At the initial state, Ri=Ai=Ro0=Ro1=Ao0=Ao1=0, and values of S0 and S1 are arbitrary values.

At the initial state, the four-phase selection circuit waits for the odd-numbered data. The input request signal Ri=1 is supplied to the four-phase selection circuit and the odd-numbered data is supplied to the parallel data signal lines, and thus, the odd-numbered data transfer state is ready. In the odd-numbered data transfer state, the destination information signals that indicate the transfer direction of the data pair including the odd-numbered data and the following even-numbered data are supplied to the four-phase selection circuit. If the transfer direction of the data pair is the zeroth data output side, then (S0, S1)=(1, 0) are supplied. If the transfer direction of the data pair is the first data output side, then (S0, S1)=(0, 1) are supplied.

If (S0, S1)=(1, 0) are supplied, Ro0 becomes Ro0=1, while Ro1 is maintained as Ro1=0 by the Muller's C element, and the request signal is sent only to the zeroth data output side. On the other hand, if (S0, S1)=(0, 1) are supplied, Ro0 is maintained as Ro0=0, while Ro1 becomes Ro1=1 by the Muller's C element, and the request signal is sent only to the first data output side.

When Ro0=1 at the odd-numbered data transfer, the acknowledgment signal Ao0=1 from the zeroth data output side is supplied. When Ro1=1 at the odd-numbered data transfer, the acknowledgment signal Ao1=1 from the first data output side is supplied. In either case, the four-phase selection circuit outputs Ai=1 and enters the even-numbered data waiting state.

At the even-numbered data waiting state, the input request signal Ri=0 is supplied to the four-phase selection circuit, the destination information signals (S0, S1)=(0, 0) are supplied, and the even-numbered data or the dummy data is supplied to the parallel data signal line, and thus, the even-numbered data transfer state is ready.

In the even-numbered data transfer state, the four-phase selection circuit operates in accordance with the destination information signals that indicate the transfer direction of the data pair supplied at the odd-numbered data transfer. If (S0, S1)=(1, 0) are supplied at the odd-numbered data transfer, Ro0 becomes Ro0=0, while Ro1 is maintained as Ro1=0 by the Muller's C element, and the request signal is sent only to the zeroth data output side. On the other hand, if (S0, S1)=(0, 1) are supplied, Ro0 is maintained as Ro0=0, while Ro1 becomes Ro1=0 by the Muller's C element, and the request signal is sent only to the first data output side.

When Ro0=0 at the even-numbered data transfer, the acknowledgment signal Ao0=0 from the zeroth data output side is supplied. When Ro1=0 at the even-numbered data transfer, the acknowledgment signal Ao1=0 from the zeroth data output side is supplied. In either case, the four-phase selection circuit outputs Ai=0 and is restored to the odd-numbered data waiting state.

The four-phase distribution circuit is a circuit for outputting input data to all of a plurality of output destination candidates, the input data being supplied to data signal lines provided in parallel. The four-phase selection circuit includes a request signal input terminal, a plurality of request signal output terminals, an acknowledgment signal output terminal, and acknowledgment signal input terminals as many as the request signal output terminals. The four-phase distribution circuit outputs the request signal from all of the request signal output terminals upon receiving the request signal through the request signal input terminal. Then, the four-phase distribution circuit outputs the acknowledgment signal from the acknowledgment signal output terminal upon receiving the acknowledgment signal from all of the acknowledgment signal input terminals.

An exemplary configuration of the four-phase distribution circuit is shown in FIG. 13. The four-phase distribution circuit shown in the figure includes the request signal input terminal Ri, the request signal output terminals Ro0, Ro1, the acknowledgment signal output terminal Ai, and the acknowledgment signal input terminals Ao0, Ao1. The four-phase distribution circuit outputs the request signal from both of the request signal output terminals Ro0, Ro1 upon receiving the request signal through the request signal input terminal Ri. Then, the four-phase distribution circuit outputs the acknowledgment signal from the acknowledgment signal output terminal Ai upon receiving the acknowledgment signal from both of the acknowledgment signal input terminals Ao0, Ao1.

The four-phase waiting circuit is a circuit for waiting for a plurality of input data items that are supplied to data signal lines provided in parallel and outputting them to one output destination. The four-phase waiting circuit includes a plurality of request signal input terminals, a request signal output terminal, acknowledgment signal output terminals as many as the request signal input terminals, and an acknowledgment signal input terminal. The four-phase waiting circuit outputs the request signal from the request signal output terminal upon receiving the request signals from all of the request signal input terminals. Then, the four-phase waiting circuit outputs the acknowledgment signals from all of the acknowledgment signal output terminals upon receiving the acknowledgment signal through the acknowledgment signal input terminal.

An exemplary configuration of the four-phase waiting circuit is shown in FIG. 14. The four-phase waiting circuit shown in FIG. 14 includes the request signal input terminals Ri0, Ri1, the request signal output terminal Ro, the acknowledgment signal output terminals Ai0, Ai1, and the acknowledgment signal input terminal Ao. The four-phase waiting circuit outputs the request signal from the request signal output terminal Ro upon receiving the request signals from both of the request signal input terminals Ri0, Ri1. Then, the four-phase waiting circuit outputs the acknowledgment signals from both of the acknowledgment signal output terminals Ai0, Ai1 upon receiving the acknowledgment signal through the acknowledgment signal input terminal Ao.

The parallel data signal lines can be configured as a bundle of a data input parallel to Ri0/Ai0 and another data input parallel to Ri1/Ai1. A combination circuit that compares both input data and selects and outputs one of them in a prescribed manner can be connected to both of the data input and the data output.

An exemplary configuration having two inputs and one output using the four-phase arbitration circuit is described below. However, the data transfer apparatus with an arbitrary number of inputs and outputs can be configured by arbitrarily combining the four-phase arbitration circuit, the four-phase waiting circuit, the four-phase distribution circuit, and the four-phase selection circuit mentioned above.

A configuration of the data transfer apparatus according to this exemplary embodiment is shown in FIG. 15. A data transfer apparatus 500 is an apparatus including two data inputs and one data output.

The data transfer apparatus 500 includes data pair generation circuits 501, 511, memories 505, 515, 525, memory control circuits 503, 513, 523, pulse signal generation circuits 504, 514, 524, multiplexers 502, 512, 522, a four-phase arbitration circuit 529, a request signal waiting circuit 598, and a data pair receiving circuit 599.

The memories 505, 515, 525 can be configured by level sensitive latches that directly output input data from an output terminal when a control input signal is in the high voltage state, and hold a value of the input data in the state when the control input signal is in the low voltage state. Hereinafter, the signal in the high voltage state is represented by a signal value "1", and the signal in the low voltage state is represented by a signal value "0".

The memory control circuits (Ctrl) 503, 513, 523 are configured as a memory control circuit 600 shown in FIG. 4(a). The Muller's C element 601 included in the memory control circuit 600 is configured by the 3-input majority decision cell 601a and the feedback loop 601b, as shown in FIG. 4(b).

The four-phase arbitration circuit 529 is the same as the arbitration circuit 100 shown in FIG. 1. If one input request signal is Ri0=1 and the other input signal is Ri1=0 and the output acknowledgment signal is Ai1=0, the four-phase arbitration circuit 529 outputs the arbitration result signal (Gr0, Gr1)=(1, 0) and performs the signal transition Ri0=1→Ro=1→Ao=1→Ai0=1→Ri0=0→Ro=0→Ao=0→Ai0=0 in order. This case indicates that the use right of the handshake signal route of the arbitration circuit is given to the zeroth input side.

Similarly, if one input request signal is Ri1=1 and the other input signal is Ri0=0 and the output acknowledgment signal is Ai0=0, the four-phase arbitration circuit 529 outputs the arbitration result signal (Gr0, Gr1)=(0, 1) and performs the signal transition Ri1=1→Ro=1→Ao=1→Ai1=1→Ri1=0→Ro=0→Ao=0→Ai1=0 in order. This case indicates that the use right of the handshake signal route of the arbitration circuit is given to the first input side.

The pulse signal generation circuits (PG) 504, 514, 524 are configured as a pulse signal generation circuit 700 including an EXCLUSIVE-OR element 701 and a delay element 702 shown in FIG. 5.

Note that, in the pulse signal generation circuits 504, 514, 524, the pulse signal generation circuit 524 that is located at a preceding state of the data pair receiving circuit 599 can be omitted.

The multiplexers 502, 512 are configured as a combinational logic circuit. On the other hand, the multiplexer 522 is configured as a sequential circuit that receives the signals Gr0, Gr1 from the four-phase arbitration circuit 529 as the control input signals, propagates the data from an input terminal Dm0 to an output terminal Dm2 when Gr0=1 and Gr1=0, propagates data from input terminal Dm1 to the output terminal Dm2 when Gr0=0 and Gr1=1, holds the data output immediately before the control input signals change to Gr0=Gr1=0, and outputs the data from the output terminal Dm2 when Gr0=Gr1=0.

The request signal waiting circuit 598 is configured by an AND element and a NOT element.

The data pair generation circuits 501, 511 are configured as the synchronous sequential circuit that executes Steps S401 to S410, S420, and S430 shown in FIG. 6. At this time, input acknowledgment signals Am0 and Am1 that are supplied to the data pair generation circuits 501, 511 are asynchronous signals. Therefore, the data pair generation circuits 501, 511 can be configured by a circuit or the like having a plurality of flip-flops connected in series so as to synchronize the asynchronous signals. Each of the data pair generation circuits 501, 511 includes a first output terminal for outputting the odd-numbered data of the data pair and a second output terminal for outputting the even-numbered data of the data pair.

The data pair receiving circuit 599 is configured as the synchronous sequential circuit that executes Steps S423 to S425 and S429 shown in FIG. 6. At this time, the waiting request signal Rf that is supplied to the data pair receiving circuit 599 is the asynchronous signal. Therefore, the data pair receiving circuit 599 can be configured by a circuit or the like having a plurality of flip-flops connected in series so as to synchronize the asynchronous signal.

The waveforms of signals corresponding to the operations of the data pair generation circuit 501, the multiplexer 502, the memory control circuits 503, the pulse signal generation circuits 504, and the memory 505 in the data transfer apparatus 500 are shown in FIG. 16, assuming that the state where the values of all signals in the data transfer apparatus 500 are zero is set as the initial state.

Assume that two data items d0 and d1 are supplied as data input Di0 to the data pair generation circuit 501 by a given time (Steps S401, S402). At this time, the number of data items is two, that is even (Step S403/Yes), so the data pair generation circuit 501 outputs the data d0 and d1 as a new data pair to the multiplexer 502 and outputs the request signal Rm0=1 to the multiplexer 502 and the memory control circuit 503 (Step S410). The multiplexer 502 outputs data Dp0 (=d0) that is output from the first terminal of the data pair generation circuit 501 in response to the request signal Rm0=1 that is supplied from the data pair generation circuit 501, to the memory 505 as the own output data Dm0 (Step S411).

Because the acknowledgment signal is Ax0=0 (Step S412/Yes), upon receiving the request signal Rm0=1 from the data pair generation circuit 501, the memory control circuit 503 outputs the acknowledgment signal Am0=1 to the data pair generation circuit 501, the request signal Rx0=1 to the four-phase arbitration circuit 529, and the memory control signal Lt0=1 to the pulse signal generation circuit 504 (Step S413).

The pulse signal generation circuit 504 generates a pulse signal P0 the values of which changes as 0→1→0 in response to the rising transition of a memory control signal Lt0 and outputs it to the memory 505 (Step S414). When the pulse signal P0 is supplied from the pulse signal generation circuit 504, the memory 505 stores the data Dm0=d0 output from the multiplexer 502 at the time (Step S415).

The data pair generation circuit 501 keeps outputting the data pair d0 and d1 and outputs the request signal Rm0=0 to the multiplexer 502 and the memory control circuit 503, upon receiving the acknowledgment signal Am0=1 from the memory control circuit 503 Step S420). The multiplexer 502 outputs the data Dn0 (=d1) that is output from the second output terminal of the data pair generation circuit 501, to the memory 505 as the own output data Dm0, upon receiving the request signal Rm0=0 from the data pair generation circuit 501 (Step S421).

The data transfer apparatus 500 is different from the data transfer apparatus 300 shown in FIG. 3 in the memory 505 that is not directly connected to the data pair receiving circuit 599. However, the data transfer apparatus 500 operates in the same manner as the data transfer apparatus 300 by the operations of the four-phase arbitration circuit 529 and the memory control circuit 523. Therefore, the memory control circuit 503 receives the acknowledgment signal Ax0=1 as the response to the request signal Rx0=1 from the four-phase arbitration circuit 529 (Step S423).

Note that the operations of Steps S424, S425 are performed at the data pair receiving circuit 599 and these are not related to the operations of the data pair generation circuit 501, the multiplexer 502, the memory control circuits 503, the pulse signal generation circuits 504, and the memory 505. Here, assume that those steps do not exist, and that the process proceeds to Step S426 after the end of Step S423.

The memory control circuit 503 outputs the acknowledgment signal Am0=0 to the data pair generation circuit 501, the request signal Rx0=0 to the four-phase arbitration circuit 529, and the memory control signal Lt0=0 to the pulse signal generation circuit 504, in response to the acknowledgment signal Ax0=1 supplied from the four-phase arbitration circuit 529 (Step S426).

The pulse signal generation circuit 504 generates the pulse signal P0 the values of which changes as 0→1→0 in response to the falling transition of the memory control signal Lt0 and outputs it to the memory 505 (Step S427). The memory 505 stores the data Dm0=d1 output from the multiplexer 502 at the time (Step S428).

The memory control circuit 503 receives the acknowledgment signal Ax0=0 as the response to the request signal Rx0=0 from the four-phase arbitration circuit 529 by the operations of the four-phase arbitration circuit 529 and the memory control circuit 523 (Step S429).

Because the number of the unsent data items at the data pair generation circuit 501 becomes zero when the data items d0 and d1 are sent from the data pair generation circuit 501 (Step S430/Yes), the data transfer apparatus 500 returns to Step S401 and enters the input data waiting state.

Here, assume that one data item d2 is supplied to the data pair generation circuit 501 from the outside of the data transfer apparatus 500 through the data input Di0 by the time when the transfer of the data d0, d1 is completed (Steps S401, S402). At this time, the data pair generation circuit 501 adds one dummy data item dm0 (Step S404) because the number of the data items is one, that is odd (Step S403/No). The dummy data dm0 may be any value. For example, the value of the dummy data dm0 may be equal to that of the data d2 that is previously supplied to the data pair generation circuit 501. Thus, no switching is performed on the data signal line. This makes it possible to reduce the power consumption.

The data pair generation circuit 501 outputs the d2 and dm0 to the multiplexer 502 as a new data pair and outputs the request signal Rm0=1 to the multiplexer 502 and the memory control circuit 503 (Step S410).

The multiplexer 502 outputs the data Dp0 (=d2) that is output from the first output terminal of the data pair generation circuit 501, to the memory 505 as the own output data Dm0 in response to the request signal Rm0=1 that is supplied from the data pair generation circuit 501 (Step S411).

Because the acknowledgment signal is Ax0=0 (Step S412), upon receiving the request signal Rm0=1 from the data pair generation circuit 501, the memory control circuit 503 outputs the acknowledgment signal Am0=1 to the data pair generation circuit 501, the request signal Rx0=1 to the four-phase arbitration circuit 529, and the memory control signal Lt0=1 to the pulse signal generation circuit 504 (Step S413).

The pulse signal generation circuit 504 generates the pulse signal P0 the value of which changes as 0→1→0 in response to the rising transition of the memory control signal Lt0 and outputs it to the memory 505 (Step S414). When the pulse signal P0 is supplied from the pulse signal generation circuit 504, the memory 505 stores the data Dm0=d2 output from the multiplexer 502 at the time (Step S415).

The data pair generation circuit 501 keeps outputting the data pair d2 and dm0 and outputs the request signal Rm0=0 to the multiplexer 502 and the memory control circuit 503, upon receiving the acknowledgment signal Am0=1 from the memory control circuit 503 (Step S420). The multiplexer 502 outputs the data Dn0 (=dm0) that is output from the second output terminal of the data pair generation circuit 501 to the memory 505 as the own output data Dm0, upon receiving the request signal Rm0=0 from the data pair generation circuit 501 (Step S421).

The data transfer apparatus 500 is different from the data transfer apparatus 300 shown in FIG. 3 in the memory 505 that is not directly connected to the data pair receiving circuit 599. However, the data transfer apparatus 500 operates in the same manner as the data transfer apparatus 300 by the operations of the four-phase arbitration circuit 529 and the memory control circuit 523. Therefore, the memory control circuit 503 receives the acknowledgment signal Ax0=1 as the response to the request signal Rx0=1 from the four-phase arbitration circuit 529 (Step S423).

As mentioned above, the operations of Step S424, S425 are performed at the data pair receiving circuit 599 and are not related to the operations of the data pair generation circuit 501, the multiplexer 502, the memory control circuit 503, the pulse signal generation circuit 504, and the memory 505. Here, assume that steps do not exist and that the process proceeds to Step S426 after the end of Step S423.

The memory control circuit 503 outputs the acknowledgment signal Am=0 to the data pair generation circuit 501, the request signal Rx0=0 to the four-phase arbitration circuit 529, and the memory control signal Lt0=0 to the pulse signal generation circuit 504, upon receiving the acknowledgment signal Ax0=1 from the four-phase arbitration circuit 529 (Step S426).

The pulse signal generation circuit 504 generates the pulse signal P0 the value of which changes as 0→1→0 in response to the falling transition of the memory control signal Lt0 and outputs it to the memory 505 (Step S427). When the pulse signal P0 is supplied from the pulse signal generation circuit 504, the memory 505 stores the data Dm0=dm0 output from the multiplexer 502 at the time (Step S428).

The memory control circuit 503 receives the acknowledgment signal Ax0=0 as the response to the request signal Rx0=0 from the four-phase arbitration circuit 529 by the operations of the four-phase arbitration circuit 529 and the memory control circuit 523 (Step S429).

Because the number of the unsent data items at the data pair generation circuit 501 becomes zero when the data items d2 and dm0 are sent from the data pair generation circuit 501 (Step S430/Yes), the data transfer apparatus 500 returns to Step S401 and enters the input data waiting state.

Next, as for the operations of the memory control circuit 523, the pulse signal generation circuit 524, the memory 525, the request signal waiting circuit 598, and the data pair receiving circuit 599 among the components of the data transfer apparatus 500, FIG. 17 shows waveforms of signals in the case that data items d8, d9, d10, and dummy data dm2 are transferred from the multiplexer 522 to the memory 525 from the initial state at which the values of all signals in the data transfer apparatus 500 are zero. Note that an acknowledgment signal Ay corresponds to the acknowledgment signal Ar shown in FIG. 6. A request signal corresponds to a request signal Rx shown in FIG. 6.

Steps S401 to S404 are the operations for the data pair generation circuits 501, 511 to receive data from the outside of the data transfer apparatus 500. These operations are not related to the memory control circuit 523, the pulse signal generation circuit 524, the memory 525, the request signal waiting circuit 598, and the data pair receiving circuit 599.

When the request signal Rx2=1 arrives at the memory control circuit 523, the request signals Rm0, Rm1 are output by the data pair generation circuits 501, 511 and the data Dx2=d8 is output from the multiplexer 522 by the same operations as the operations of Steps S410 and S411 (operations in which the odd-numbered data is output by the multiplexers 502, 512).

Here, the operations of the memory control circuit 523, the pulse signal generation circuit 524, the memory 525, the request signal waiting circuit 598, and the data pair receiving circuit 599 are focused, so only the operations after Step S412 are explained.

Because the acknowledgment signal is Ay=0 at the timing when the request signal Rx2=1 is supplied from the four-phase arbitration circuit 529 (Step S412), the memory control circuit 523 outputs the request signal Ry=1 to the request signal waiting circuit 598, the acknowledgment signal Ax2=1 to the four-phase arbitration circuit 529, and the memory control signal Lt2=1 to the pulse signal generation circuit 524 (Step S413).

The pulse signal generation circuit 524 generates a pulse signal P2 the value of which changes as 0→1→0 in response to the rising transition of a memory control signal Lt2 and outputs it to the memory 525 (Step S414). When the pulse signal P2 is supplied from the pulse signal generation circuit 524, the memory 525 stores the data Dx2=d8 output from the multiplexer 522 at the time (Step S415).

The four-phase arbitration circuit 529 outputs the request signal Rx2=0 to the memory control circuit 523 and the arbitration result signals Gr0 and Gr1 to the multiplexer 522 upon receiving the acknowledgment signal Ax2=1 from the memory control circuit 523 (Step S420). Note that each value of Gr0 and Gr1 in this case is determined depending on which of the memories 503 and 513 the data items d8 and d9 are supplied from. However, explanation is made assuming that the source of the data is not specified so as to simplify the explanation. The multiplexer 522 outputs the data Dx2=d9 upon receiving the arbitration result signals Gr0 and Gr1 from the four-phase arbitration circuit 529 (Step S421).

The request signal waiting circuit 598 waits for the request signal Ry=1 from the memory control circuit 523 and the request signal Rx2=0 from the four-phase arbitration circuit 529 and outputs the request signal Rf=1 to the data pair receiving circuit 599 (Step S422).

The data pair receiving circuit 599 receives the data Dy=d8 stored in the memory 525 and the data Dx2=d9 output from the multiplexer 522, upon receiving the request signal Rf=1 from the request signal waiting circuit 598 (Step S423).

After receiving the data pair, the data pair receiving circuit 599 outputs the data items d8 and d9 to the outside of the data transfer apparatus 500 (Steps S424, S425). The data pair receiving circuit 599 outputs the acknowledgment signal Ay=1 to the memory control circuit 523 upon receiving the waiting request signal RF=1 from the request signal waiting circuit 598.

After receiving the acknowledgment signal Ay=1 from the data pair receiving circuit 599, the memory control circuit 523 outputs the request signal Ry=0 to the request signal waiting circuit 598, the acknowledgment signal Ax2=0 to the four-phase arbitration circuit 529, and the memory control signal Lt2=0 to the pulse signal generation circuit 524, upon receiving the request signal Rx2=0 from the four-phase arbitration circuit 529 (Step S426). The pulse signal generation circuit 524 generates the pulse signal P2 the values of which changes as 0→1→0 in response to the falling transition of the memory control signal Lt2 from the memory control circuit 523 and outputs it to the memory 525 (Step S427). When the pulse signal P2 is supplied from the pulse signal generation circuit 524, the memory 525 stores the data Dx2=d9 output from the multiplexer 522 at the time (Step S428).

The request signal waiting circuit 598 outputs the waiting request signal Rf=0 to the data pair receiving circuit 599 on receiving the request signal Ry=0 from the memory control circuit 523. The data pair receiving circuit 599 outputs the acknowledgment signal Ay=0 to the memory control circuit 523 upon receiving the waiting request signal Rf=0 from the request signal waiting circuit 598 (Step S429).

At this point, the memory control circuit 523, the pulse signal generation circuit 524, the memory 525, the request signal waiting circuit 598, and the data pair receiving circuit 599 is in a state of waiting for the operation at the conditional branch of the data pair generation circuit at Step S430. Because the data d10 and the dummy data dm2 that are transferred through the multiplexer 522 are left, the process returns to Step S410 (Step S430/No).

When the request signal Rx2=1 arrives at the memory control circuit 523, the request signals Rm0, Rm1 are output by the data pair generation circuits 501, 511 and the data Dx2=d10 is output from the multiplexer 522 by the same operations as the operations of Steps S410 and S411 (operations in which the odd-numbered data is output by the multiplexers 502, 512).

Because the acknowledgment signal is Ay=0 at the timing when the request signal Rx2=1 is supplied from the four-phase arbitration circuit 529 (Step S412), the memory control circuit 523 outputs the request signal Ry=1 to the request signal waiting circuit 598, the acknowledgment signal Ax2=1 to the four-phase arbitration circuit 529, and the memory control signal Lt2=1 to the pulse signal generation circuit 524 (Step S413).

The pulse signal generation circuit 524 generates the pulse signal P2 the value of which changes as 0→1→0 in response to the rising transition of the memory control signal Lt2=1 and outputs it to the memory 525 (Step S414). When the pulse signal P2 is supplied from the pulse signal generation circuit 524, the memory 525 stores the data Dx2=d10 output from the multiplexer 522 at the time (Step S415).

The four-phase arbitration circuit 529 outputs the request signal Rx2=0 to the memory control circuit 523 and the arbitration result signals Gr0 and Gr1 to the multiplexer 522 upon receiving the acknowledgment signal Ax2=1 from the memory control circuit 523 (Step S420). The multiplexer 522 outputs the dummy data Dx2=dm2 upon receiving the arbitration result signals Gr0 and Gr1 from the four-phase arbitration circuit 529 (Step S421).

The request signal waiting circuit 598 waits for the request signal Ry=1 from the memory control circuit 523 and the request signal Rx2=0 from the four-phase arbitration circuit 529 and outputs the waiting request signal Rf=1 to the data pair receiving circuit 599 (Step S422).

The data pair receiving circuit 599 receives the data Dy=d10 stored in the memory 525 and the dummy data Dx2=dm2 output from the multiplexer 522, upon receiving the waiting request signal Rf=1 from the request signal waiting circuit 598 (Step S423).

Here, if the dummy data dm2 includes a signal indicating that the dummy data dm2 is dummy, the data pair receiving circuit 599 may only receive the data d10 and discard the dummy data dm2. In this case, the data pair receiving circuit 599 outputs only the data d10 to the outside of the data transfer apparatus 500 (Steps S424 and S425). Further, the data pair receiving circuit 599 outputs the acknowledgment signal Ay=1 to the memory control circuit 523 upon receiving the waiting request signal Rf=1 from the request signal waiting circuit 598.

After receiving the acknowledgment signal Ay=1 from the data pair receiving circuit 599, the memory control circuit 523 outputs the request signal Ry=0 to the request signal waiting circuit 598, the acknowledgment signal Ax2=0 to the four-phase arbitration circuit 529, and the memory control signal Lt2=0 to the pulse signal generation circuit 524, upon receiving the request signal Rx2=0 from the four-phase arbitration circuit 529 (Step S426). The pulse signal generation circuit 524 generates the pulse signal P2 the value of which changes as 0→1→0 in response to the falling transition of the memory control signal Lt2 from the memory control circuit 523 and outputs it to the memory 525 (Step S427). When the pulse signal P2 is supplied from the pulse signal generation circuit 524, the memory 525 stores the dummy data Dx2=dm2 output from the multiplexer 522 at the time (Step S428).

The request signal waiting circuit 598 outputs the waiting request signal Rf=0 to the data pair receiving circuit 599 upon receiving the request signal Ry=0 from the memory control circuit 523. The data pair receiving circuit 599 outputs the acknowledgment signal Ay=0 to the memory control circuit 523 upon receiving the waiting request signal Rf=0 from the request signal waiting circuit 598 (Step S429).

At this point, the memory control circuit 523, the pulse signal generation circuit 524, the memory 525, the request signal waiting circuit 598, and the data pair receiving circuit 599 are in a state of waiting for the operation at the conditional branch of the data pair generation circuit at Step S430. Because the data d10 and the dummy data dm2 that are transferred through the multiplexer 522 are not left, the process returns to Step S401 and the data transfer apparatus 500 enters the input data waiting state (Step S430/Yes).

Next, as for the operations of the memory control circuits 503, 513, 523, the pulse signal generation circuits 504, 514, 524, the memories 505, 515, 525, the four-phase arbitration circuit 529, and the multiplexer 522 among the components of the data transfer apparatus 500, FIG. 18 shows waveforms of signals assuming that state where the values of all signals in the apparatus are zero is set as the initial state.

Assume that four data items d3, d4, d5, and d6 are sent to the memory 505, and that one data item d7 and dummy data dm1 added by the data pair generation circuit 511 are sent to the memory 515.

First, when the data items d3, d7 are sent from the memories 505, 515, the memory control circuits 503, 513 send the request signals Rx0=1 and Rx1=1 to the four-phase arbitration circuit 529.

The four-phase arbitration circuit 529 gives the use right of the handshake signal route to the memory control circuit 503 that has output the first arrived Rx0=1 of the received request signals Rx0=1 and Rx1=1 by outputting the arbitration result signals Gr0=1 and Gr1=0 to the multiplexer 522. Further, the four phase arbitration circuit 529 outputs the request signal Rx2=1 to the memory control circuit 523.

The multiplexer 522 outputs the data Dx0=d3 that is output from the memory 505 as the own output data Dx2, upon receiving the arbitration result signals Gr0=1, Gr1=0.

The memory control circuit 523 outputs the acknowledgment signal Ax2=1 to the four-phase arbitration circuit 529 and the memory control signal Lt2=1 to the pulse signal generation circuit 524, upon receiving the request signal Rx2=1 from the four-phase arbitration circuit 529. The pulse signal generation circuit 524 generates the pulse signal P2 the value of which changes as 0→1→0 in response to the rising transition of the memory control signal Lt2 and outputs it to the memory 525. When the pulse signal P2 is supplied from the pulse signal generation circuit 524, the memory 525 stores the data Dx2=d3 output from the multiplexer 522 at the time.

The four-phase arbitration circuit 529 outputs the acknowledgment signal Ax0=1 to the memory control circuit that is given the use right (i.e., the memory control circuit 503 in this case) upon receiving the acknowledgment signal Ax2=1 from the memory control circuit 523.

The memory control circuit 503 outputs the request signal Rx0=0 to the four-phase arbitration circuit 529 and the memory control signal Lt0=0 to the pulse signal generation circuit 504, upon receiving the acknowledgment signal Ax0=1 from the four-phase arbitration circuit 529. The pulse signal generation circuit 504 generates the pulse signal P0 the value of which changes as 0→1→0 in response to the falling transition of the memory control signal Lt0 and outputs it to the memory 505. The memory 505 that has received the pulse signal P0 outputs the data d4.

The four-phase arbitration circuit 529 outputs the request signal Rx2=0 to the memory control circuit 423 and the arbitration result signals Gr0=Gr1=0 to the multiplexer 522, in response to the request signal Rx0=0 received from the memory control circuit 503.

The multiplexer 522 keeps propagation from a data input Dx0 to a data output Dx2 (that is to say, propagation is kept while the use right of the handshake signal route is given to the memory control circuit 503) in response to the arbitration result signals Gr0=0 and Gr1=0 supplied from the four-phase arbitration circuit 529, and outputs the data d4 from the data input Dx0 as the own output data Dx2.

The memory control circuit 523 outputs the acknowledgment signal Ax2=0 to the four-phase arbitration circuit 529 and the memory control signal Lt2=0 to the pulse signal generation circuit 524, upon receiving the request signal Rx2=0 from the four-phase arbitration circuit 529. The pulse signal generation circuit 524 generates the pulse signal P2 the value of which changes as 0→1→0 in response to the falling transition of the memory control signal Lt2 from the memory control circuit 523 and outputs it to the memory 525. When the pulse signal P2 is supplied from the pulse signal generation circuit 524, the memory 525 stores the data d4 output from the multiplexer 522 at the time.

The four-phase arbitration circuit 529 gives the use right to the memory control circuit 513 (the memory control circuit that outputs the request signal Rx1=1) that is waiting for the use right, by outputting the arbitration result signals Gr0=0, Gr1=1 to the multiplexer 522 in response to the acknowledgment signal Ax2=0 from the memory control circuit 523. Further, the four-phase arbitration circuit 529 outputs the acknowledgment signal Ax0=0 to the memory control circuit 503 and the request signal Rx2=1 to the memory control circuit 523.

The multiplexer 522 outputs the data d7 from the data input Dx1 as the own output Dx2 in response to the arbitration result signals Gr0=0, Gr1=1.

The memory control circuit 523 outputs the acknowledgment signal Ax2=1 to the four-phase arbitration circuit 529 and the memory control signal Lt2=1 to the pulse signal generation circuit 524, upon receiving the request signal Rx2=1 from the four-phase arbitration circuit 529. The pulse signal generation circuit 524 generates the pulse signal P2 the value of which changes as 0→1→0 in response to the rising transition of the memory control signal Lt2 and outputs it to the memory 525. When the pulse signal P2 is supplied from the pulse signal generation circuit 524, the memory 525 stores the data Dx2=d7 output from the multiplexer 522 at the time.

The four-phase arbitration circuit 529 outputs the acknowledgment signal Ax1=1 to the memory control circuit that is given the use right (i.e., the memory control circuit 513 in this case) upon receiving the acknowledgment signal Ax2=1 from the memory control circuit 523.

The memory control circuit 513 outputs the request signal Rx1=0 to the four-phase arbitration circuit 529 and the memory control signal Lt1=0 to the pulse signal generation circuit 514, upon receiving the acknowledgment signal Ax1=1 from the four-phase arbitration circuit 529. The pulse signal generation circuit 514 generates the pulse signal P1 the value of which changes as 0→1→0 in response to the falling transition of the memory control signal Lt1 and outputs it to the memory 515. The memory 515 that has received the pulse signal P0 outputs the data dm1.

The four-phase arbitration circuit 529 outputs the arbitration result signals Gr0=Gr1=0 to the multiplexer 522 in response to the request signal Rx1=0 received from the memory control circuit 513.

The multiplexer 522 keeps propagation from the data input Dx1 to the data output Dx2 (that is to say, propagation is kept while the use right of the handshake signal route is given to the memory control circuit 513) in response to the arbitration result signals Gr0=0 and Gr1=0 supplied from the four-phase arbitration circuit 529, and outputs the data dm1 from the data input Dx1 as the own output data Dx2.

The four-phase arbitration circuit 529 outputs the request signal Rx2=0 to the memory control circuit 523 upon receiving the request signal Rx1=0 from the memory control circuit 513. The memory control circuit 523 outputs the acknowledgment signal Ax2=0 to the four-phase arbitration circuit 529 and the memory control signal Lt2=0 to the pulse signal generation circuit 524, upon receiving the request signal Rx2=0 from the four-phase arbitration circuit 529. The pulse signal generation circuit 524 generates the pulse signal P2 the value of which changes as 0→1→0 in response to the falling transition of the memory control signal Lt2 and outputs it to the memory 525. When the pulse signal P2 is supplied from the pulse signal generation circuit 524, the memory 525 stores the data Dx2=dm1 output from the multiplexer 522 at the time.

Assuming that the request signal Rx0=1 that requests the transfer of the next data d5 between the transfers of the data d7 and the dummy data dm1 arrives at the four-phase arbitration circuit 529 from the memory control circuit 503, the four-phase arbitration circuit 529 outputs the acknowledgment signal Ax0=0 to the memory control circuit 503 according to the acknowledgment signal Ax2=0, and the request signal Rx2=1 to the memory control circuit 523. Further, the four-phase arbitration circuit 529 gives the use right of the handshake signal route to the memory control circuit 503 (the memory control circuit that has output the request signal Rx0=1) by outputting the arbitration result signals Gr0=1, Gr1=1 to the multiplexer 522.

The multiplexer 522 outputs the data d5 from the data input Dx0 as the own output data Dx2 in response to the arbitration result signals Gr0=1 and Gr1=0 supplied from the four-phase arbitration circuit 529.

The memory control circuit 523 outputs the acknowledgment signal Ax2=1 to the four-phase arbitration circuit 529 and the memory control signal Lt2=1 to the pulse signal generation circuit 524, upon receiving the request signal Rx2=1 from the four-phase arbitration circuit 529. The pulse signal generation circuit 524 generates the pulse signal P2 the value of which changes as 0→1→0 in response to the rising transition of the memory control signal Lt2 and outputs it to the memory 525. When the pulse signal P2 is supplied from the pulse signal generation circuit 524, the memory 525 stores the data Dx2=d5 output from the multiplexer 522 at the time.

The four-phase arbitration circuit 529 outputs the acknowledgment signal Ax0=1 to the memory control circuit that is given the use right (i.e., the memory control circuit 503 in this case) upon receiving the acknowledgment signal Ax2=1 from the memory control circuit 523.

The memory control circuit 503 outputs the request signal Rx0=0 to the four-phase arbitration circuit 529 and the memory control signal Lt0=0 to the pulse signal generation circuit 504, upon receiving the acknowledgment signal Ax0=1 from the four-phase arbitration circuit 529. The pulse signal generation circuit 504 generates the pulse signal P0 the value of which changes as 0→1→0 in response to the falling transition of the memory control signal Lt0 and outputs it to the memory 505. The memory 505 that has received the pulse signal P0 outputs the data d6.

The four-phase arbitration circuit 529 outputs the request signal Rx2=0 to the memory control circuit 423 and the arbitration result signals Gr0=Gr1=0 to the multiplexer 522, in response to the request signal Rx0=0 received from the memory control circuit 503.

The multiplexer 522 keeps propagation from the data input Dx0 to the data output Dx2 (that is to say, propagation is kept while the use right of the handshake signal route is given to the memory control circuit 503) in response to the arbitration result signals Gr0=0 and Gr1=0 supplied from the four-phase arbitration circuit 529, and outputs the data d6 from the data input Dx0 as the own output data Dx2.

The memory control circuit 523 outputs the acknowledgment signal Ax2=0 to the four-phase arbitration circuit 529 and the memory control signal Lt2=0 to the pulse signal generation circuit 524, upon receiving the request signal Rx2=0 from the four-phase arbitration circuit 529. The pulse signal generation circuit 524 generates the pulse signal P2 the value of which changes as 0→1→0 in response to the falling transition of the memory control signal Lt2 from the memory control circuit 523 and outputs it to the memory 525. When the pulse signal P2 is supplied from the pulse signal generation circuit 524, the memory 525 stores the data d6 output from the multiplexer 522 at the time.

Thus, in this exemplary embodiment, the data transfer two times faster than that of the four-phase type transfer can be achieved by using the data pair generation circuits 501, 511 and the pulse signal generation circuits 504, 514, 524.

Further, in this exemplary embodiment, it is possible to apply the four-phase arbitration circuit 529 that is implemented with a simple circuit configuration as shown in FIG. 1 by using the data pair generation circuits 501, 511. The memory located at a preceding stage of the data pair receiving circuit and the pulse signal generation circuit that is directly connected to the memory control circuit can be omitted. The memory and the memory control circuit may be directly connected to each other in the data transfer apparatus according to this exemplary embodiment. For example, the data transfer apparatus 500 may have a configuration in which the pulse generation circuit 524 is omitted and the memory 525 and the memory control circuit 523 are directly connected to each other. This is because it is not necessary that the data that is output from the memory is received by the data pair receiving circuit even when the even-numbered data is stored in the memory, and because the memory operates to store only the odd-numbered data if the pulse generation circuit is omitted and the memory and the memory control circuit are directly connected to each other.

Here, assuming that the configuration that does not include the data pair generation circuits 501, 511 in the data transfer apparatus 500, consider the case where the two-phase type handshake signal and data are supplied to the memory control circuits 503, 513 and the memories 505, 515. The waveforms corresponding to the operations of the memory control circuits 503, 513, 523, the pulse signal generation circuits 504, 514, 524, the memories 505, 515, 525, and the four-phase arbitration circuit 529 in this case are shown in FIG. 19. It is assumed that three data items d3, d4, and d5 are sent to the memory 505 and one data item d7 is sent to the memory 515.

The transfers of the data d3 and d4 are performed in the same manner as in the case of including the data pair generation circuit 501. Next, the transfer of the data d5 is completed by supplying the request signal Rx1=1 from the memory control circuit 513 to the four-phase arbitration circuit 529, by supplying the request signal Rx2=1 from the four-phase arbitration circuit 529 to the memory control circuit 523, by supplying the acknowledgment signal Ax2=1 from the memory control circuit 523 to the four-phase arbitration circuit 529, and by supplying the acknowledgment signal Ax1=1 from the four-phase arbitration circuit 529 to the memory control circuit 513.

Because the data pair generation circuit 511 is not included in this case, the dummy data is not added to the data d5 and the memory control circuit 513 does not send the request signal Rx1=0 to the four-phase arbitration circuit 529 in response to the acknowledgment signal Ax1=1. Therefore, the request signal supplied from the memory control circuit 513 to the four-phase arbitration circuit 529 is maintained as Rx1=1.

Maintaining the request signal that is supplied to the four-phase arbitration circuit 529 as Rx1=1 means that even though the transfers from the memory control circuit 513 and the memory 515 are completed, the use right of the output from the four-phase arbitration circuit is continuously held by the transfer from the memory 515, and the use right is not given to the transfers from the memory control circuit 503 and the memory 505.

Therefore, even though the transfer request signal Rx0=1 of the data d6 has arrived at the four-phase arbitration circuit 529 from the memory control circuit 503 and the memory 505, the transfer through the multiplexer 522 and the four-phase arbitration circuit 529 is suspended until the next transfer arrives from the memory control circuit 513 and the memory 515.

As mentioned above, the data pair generation circuits 501, 511 are essential for using the data transfer function block that operates according to the four-phase type handshake protocol and has a simple circuit configuration while achieving the high speed transfer.

Further, in this exemplary embodiment, the level sensitive latches can be applied as the memories 505, 515, 525 by using the pulse signal generation circuits 504, 514, 524.

The data transfer apparatus according to this exemplary embodiment can be applied as the data communication between the function blocks on a semiconductor chip or between semiconductor chips.

Third Exemplary Embodiment

A third exemplary embodiment that preferably practices the present invention is described.

The configuration of a semiconductor device according to the third exemplary embodiment that preferably practices the present invention is shown in FIG. 20. In the semiconductor device, function block circuits 11 to 14, function block circuits 15 to 17, and a data transfer apparatus 50 are integrated.

In FIG. 20, the blocks denoted as "MUX+4PAC" are configured by multiplexers and four-phase arbitration circuits. Further, the blocks denoted as "B+4PSC" are configured by demultiplexers and four-phase selection circuits. Further, the blocks denoted as "M+P+C" are configured by memories, pulse generation circuits, and memory control circuits. Further, the blocks denoted as "W" indicate request signal waiting circuits.

The function block circuits 11 to 14 of the sending side send data to the connected data pair generation circuits (denoted as "DPGC" in FIG. 20). The odd-numbered data of the data supplied to the data pair generation circuits includes the destination information represented by three bits. The three bits configuring the destination information respectively correspond to the function block circuits 15 to 17 of the receiving side. That is, the bit width of the destination information corresponds to the number of the function block circuits that are the data sending destinations.

If the number of data items received from the function block circuits 11 to 14 is odd, each data pair generation circuit adds dummy data thereto to make the number of data items even, thereby generating a data pair with two data items as a pair. The memories, the pulse generation circuits, the memory control circuits, the multiplexers, the four-phase arbitration circuits, the data signal line branches, the four-phase selection circuits, and the request signal waiting circuits in the data transfer apparatus 50 transfer the data pairs toward the function block circuits of the receiving side that is the destination, in accordance with the destination information included in the data, while performing the handshake communication for communicating the request signals and the acknowledgment signals.

The data pair receiving circuits (denoted as "DPRC" in FIG. 20) send the received data pairs to the connected synchronous functional circuits of the receiving side.

Because the operations of the circuits in the data transfer apparatus 50 are the same as those in the first and second exemplary embodiments, the explanation about the internal operations is omitted.

Note that, in each of the pulse signal generation circuits of the data transfer apparatus 50, the pulse signal generation circuit located at a preceding stage of the data pair receiving circuit can be omitted.

Thus, it is possible to configure an integrated circuit (semiconductor device) with low power consumption by connecting the function block circuits with the data transfer apparatus. Because the power consumption of the function block circuits depends on the operation speed, it is possible to reduce the power consumption of the entire integrated circuit not by causing each function block circuit to constantly operate at a fixed speed but by adjusting the operation speed of each function block circuit within a minimum value in which a process required by the circuit can be performed within a permissible time.

In adjusting the processing speed, the operation timings of the function block circuits in the integrated circuit are independent of each other. In the data transfer apparatus according to this exemplary embodiment, it is possible to connect such function block circuits the operation timings of which are independent of each other. Therefore, it is possible to configure an integrated circuit that operates at a necessary speed with low power consumption by connecting the function block circuits with the data transfer apparatus according to this exemplary embodiment.

The data transfer apparatus according to this exemplary embodiment can connect the function block circuits, the operation timings of which are independent, thereby making it possible to configure an integrated circuit that radiates less electromagnetic wave.

The intensity of the electromagnetic wave radiated from the integrated circuit is proportional to the magnitude of the fluctuation of a current flowing in a circuit. Therefore, the intensity of the radiated electromagnetic wave increases because the current greatly increases when the operation timings of the function block circuits match each other. The radiated electromagnetic wave may have an influence on the operation of each element in the integrated circuit. Further, when the integrated circuit operates near a device that performs a radio communication, there is a risk of any false operation of the device. In this exemplary embodiment, the use of the data transfer apparatus makes it possible to reduce the radiated electromagnetic wave by making the operation timings of the function blocks independent of each other.

Note that the exemplary embodiments mentioned above are preferred exemplary embodiments and this invention is not limited to these exemplary embodiments.

For example, in the above exemplary embodiments, the data transfer apparatus having two inputs and one output is explained by way of example. However, the number of inputs for the request signals may be three or more. Further, the number of inputs and the number of outputs are not limited.

In this way, the present invention can be modified in various manners.

EXPLANATION OF REFERENCE

Figure 1:
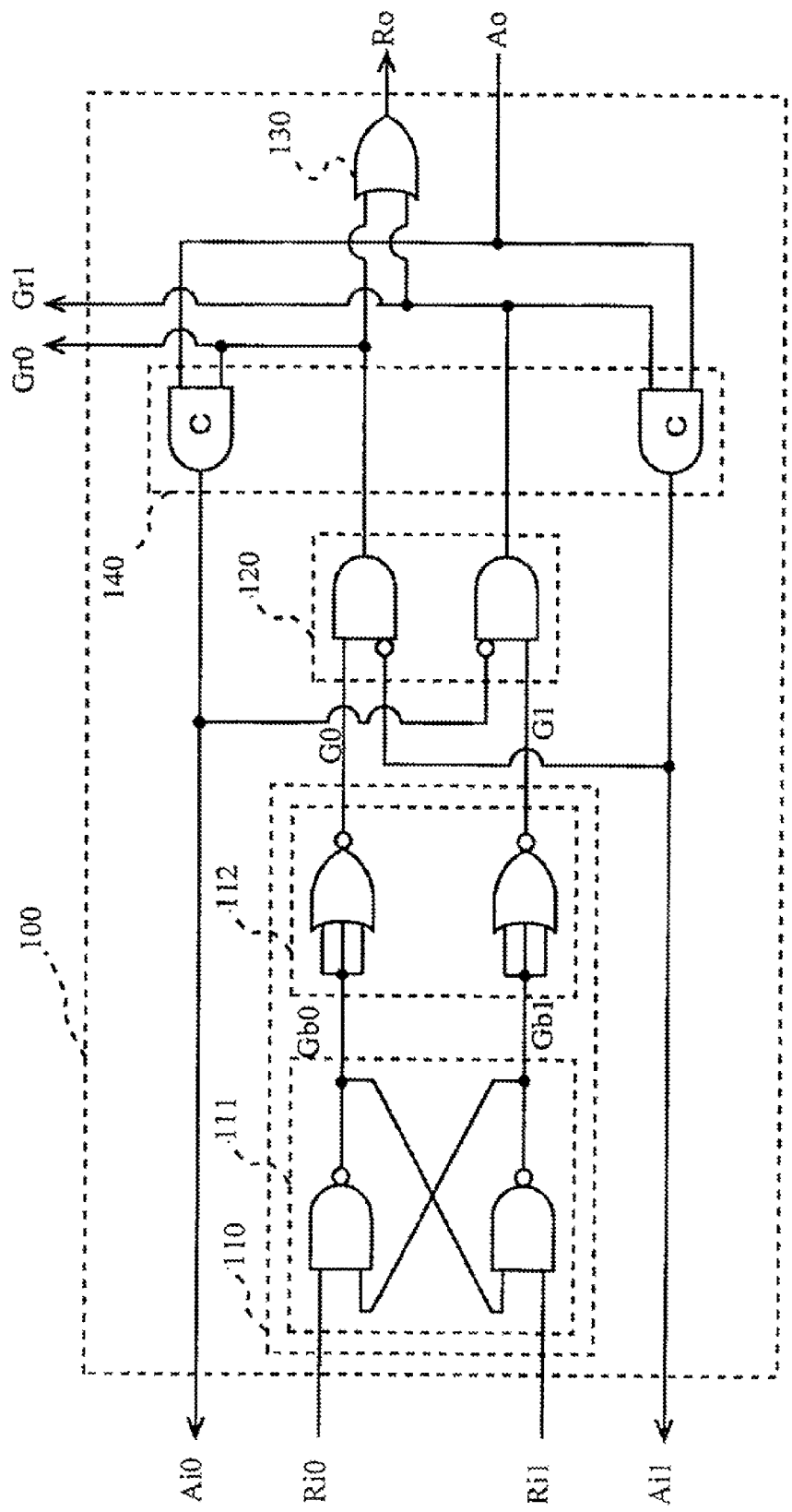
FIG. 1 is a diagram showing an exemplary configuration of an asynchronous logic circuit that arbitrates a plurality of request signals in conformity to a four-phase type handshake protocol.
Figure 2:
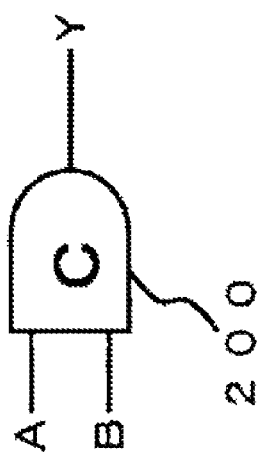
FIG. 2 is a diagram showing a circuit symbol of a symmetrical 2-input C element, an implementation example of a 3-input majority decision cell, and an operation table.
Figure 3:
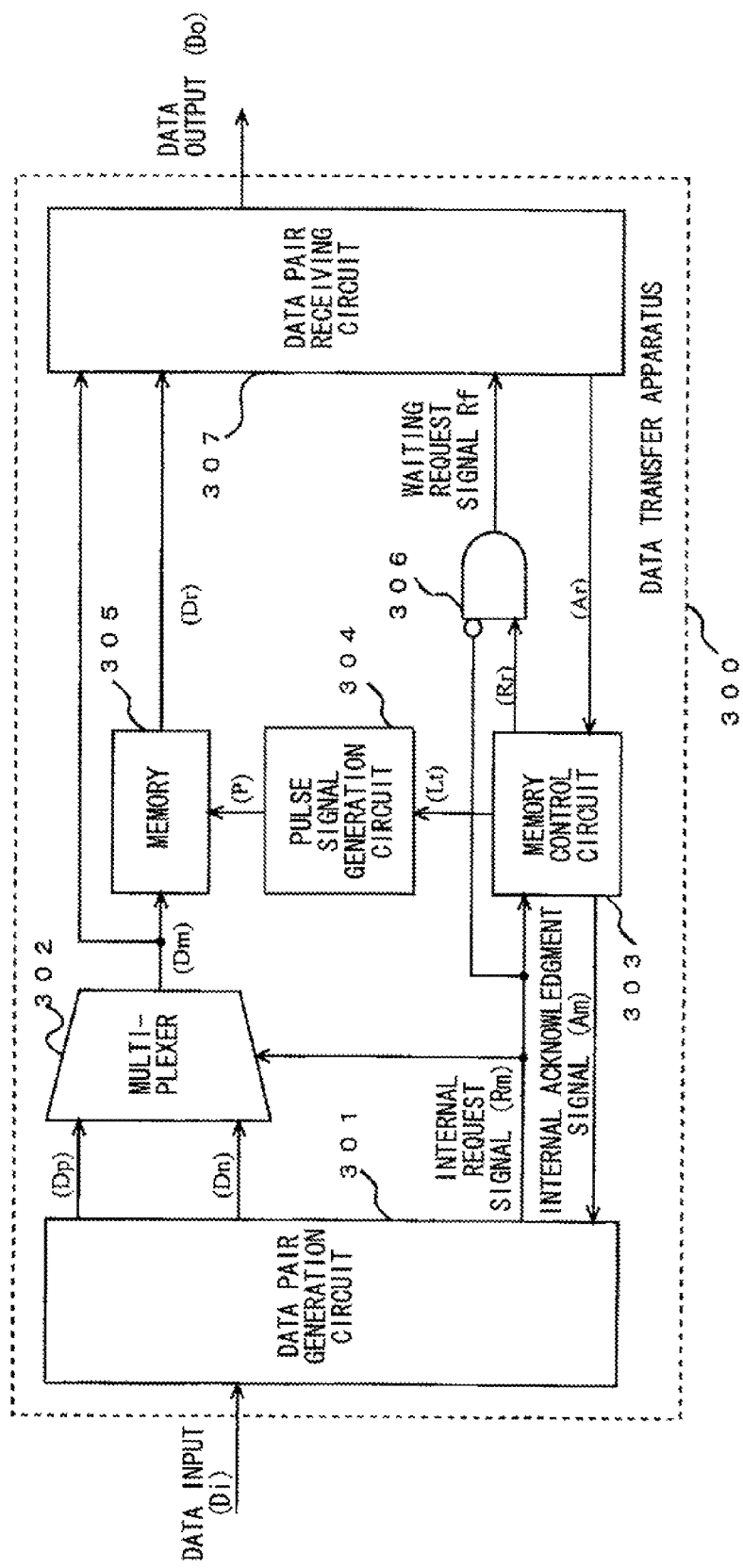
FIG. 3 is a block diagram showing a configuration of a data transfer apparatus according to a first exemplary embodiment that preferably practices the invention.
Figure 4:
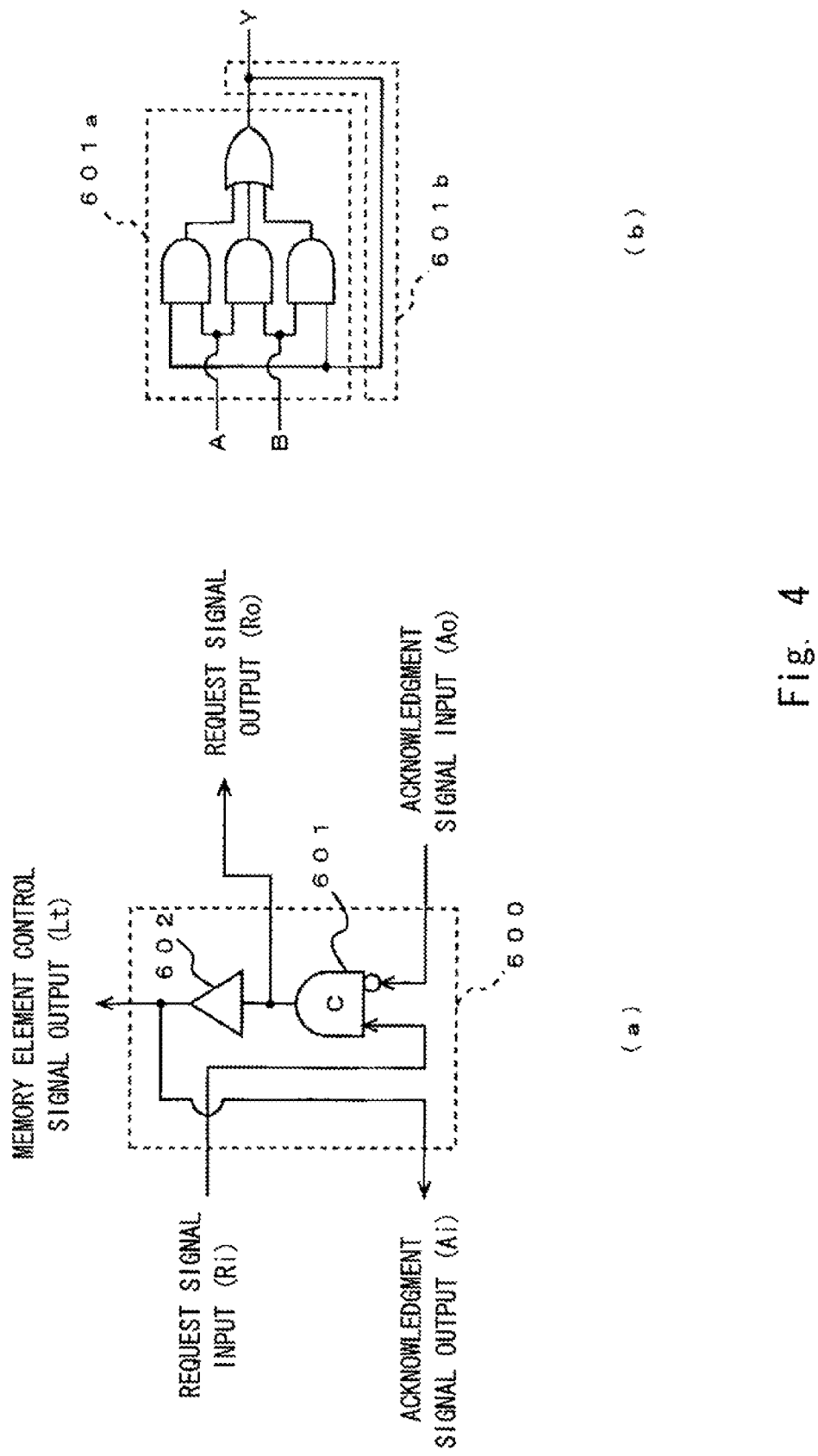
FIG. 4 are diagrams showing an exemplary configuration of a memory control circuit that is a component of the data transfer apparatus according to the first exemplary embodiment.
Figure 5:
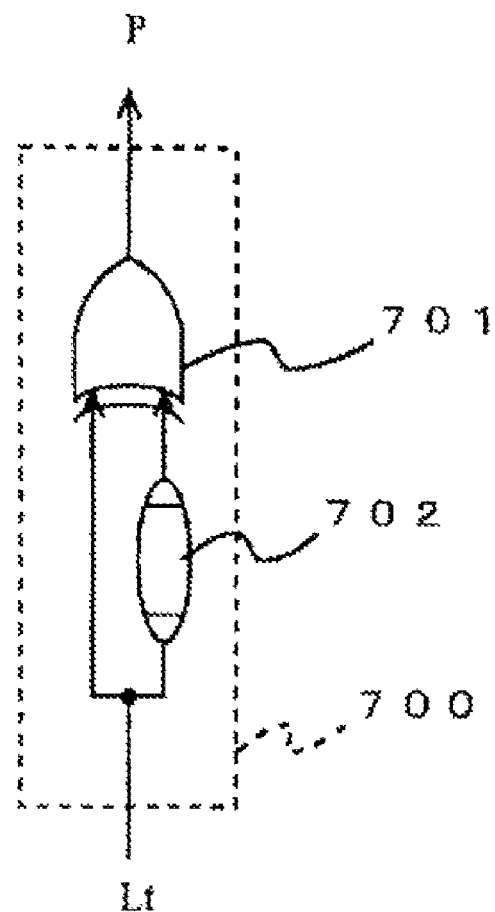
FIG. 5 is a diagram showing an exemplary configuration of a pulse signal generation circuit that is a configuration element of the data transfer apparatus according to the first exemplary embodiment.
Figure 6:
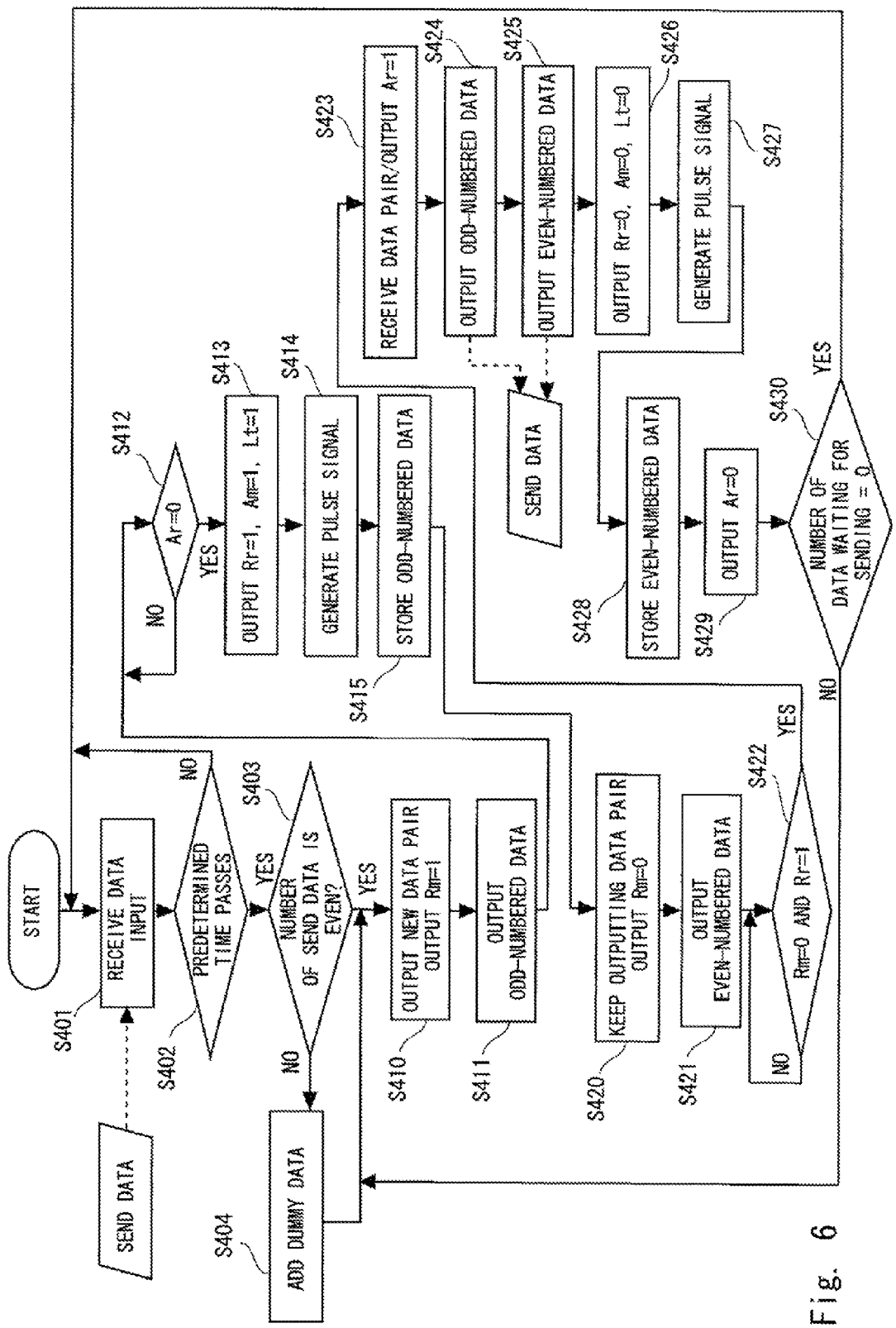
FIG. 6 is a flow chart showing operations of the data transfer apparatus according to the first exemplary embodiment.
Figure 7:
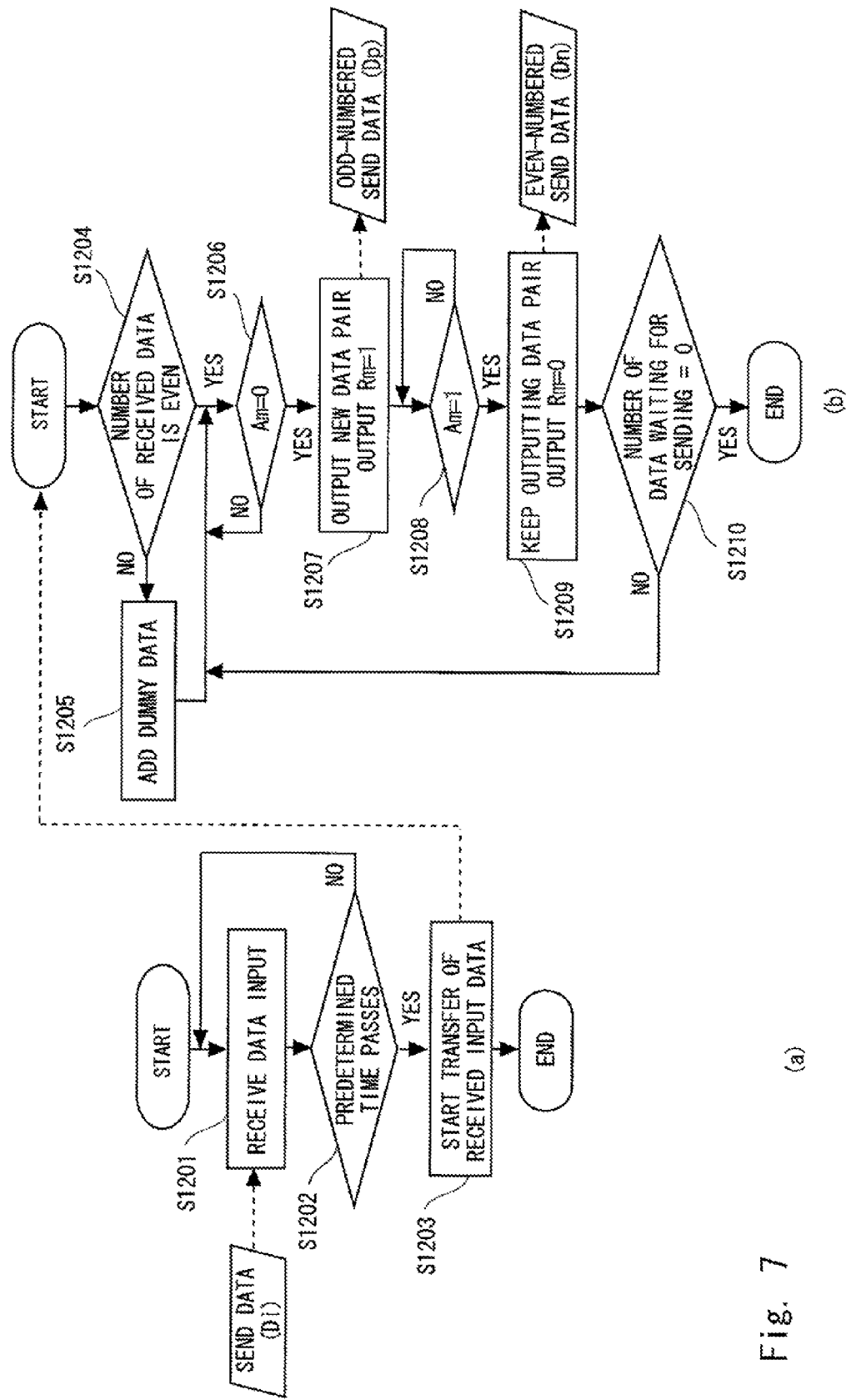
FIG. 7 is a flow chart showing operations of a data pair generation circuit of the data transfer apparatus according to the first exemplary embodiment.
Figure 8:
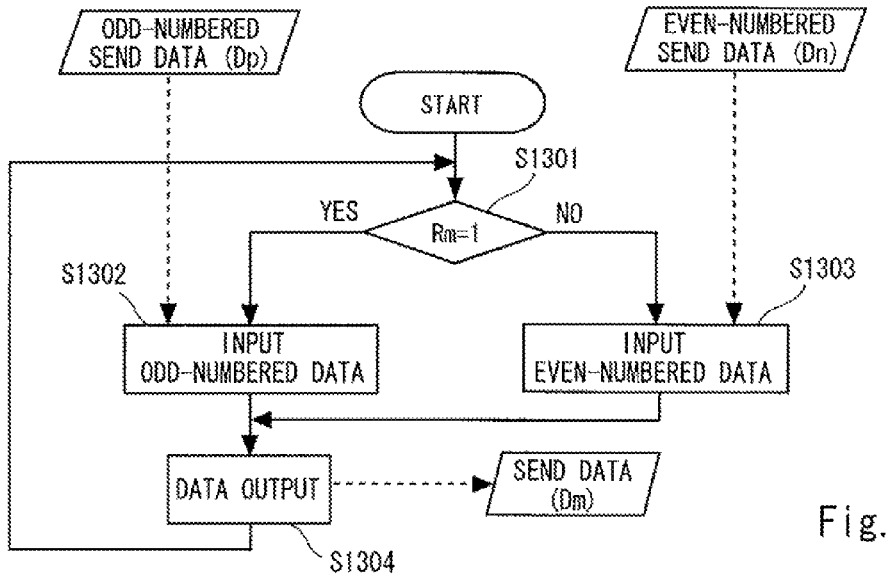
FIG. 8 is a flow chart showing operations of a multiplexer of the data transfer apparatus according to the first exemplary embodiment.
Figure 9:
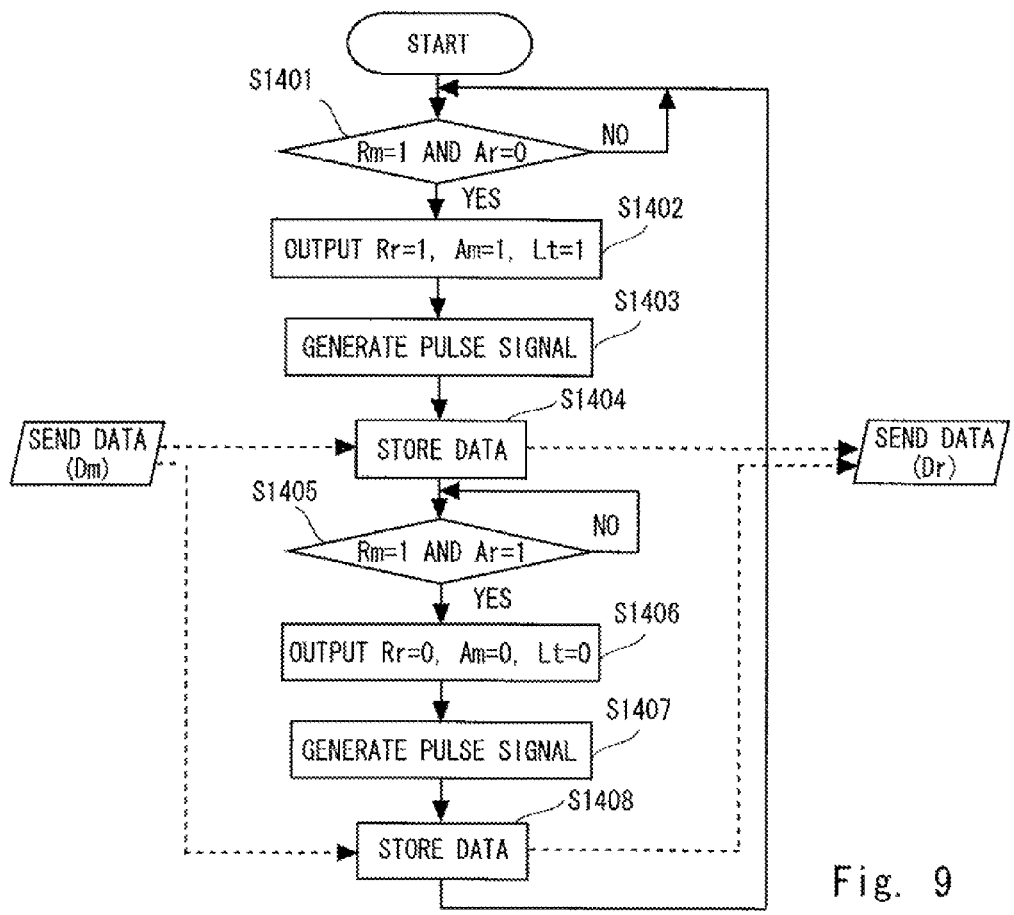
FIG. 9 is a flow chart showing operations of the memory control circuit, the pulse signal generation circuit, and a memory of the data transfer apparatus according to the first exemplary embodiment.
Figure 10:
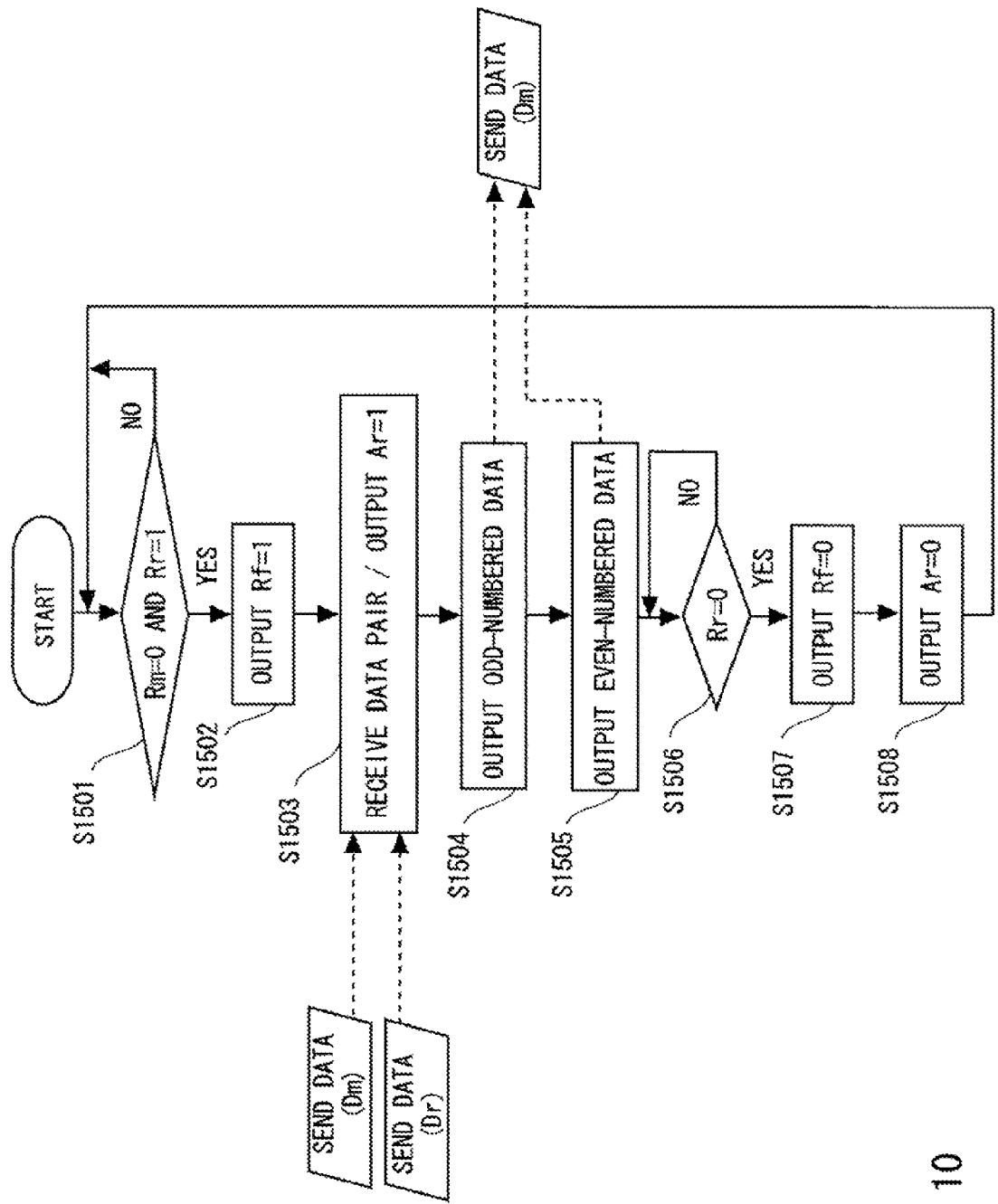
FIG. 10 is a flow chart showing operations of a request signal waiting circuit and a data pair receiving circuit of the data transfer apparatus according to the first exemplary embodiment.
Figure 11:
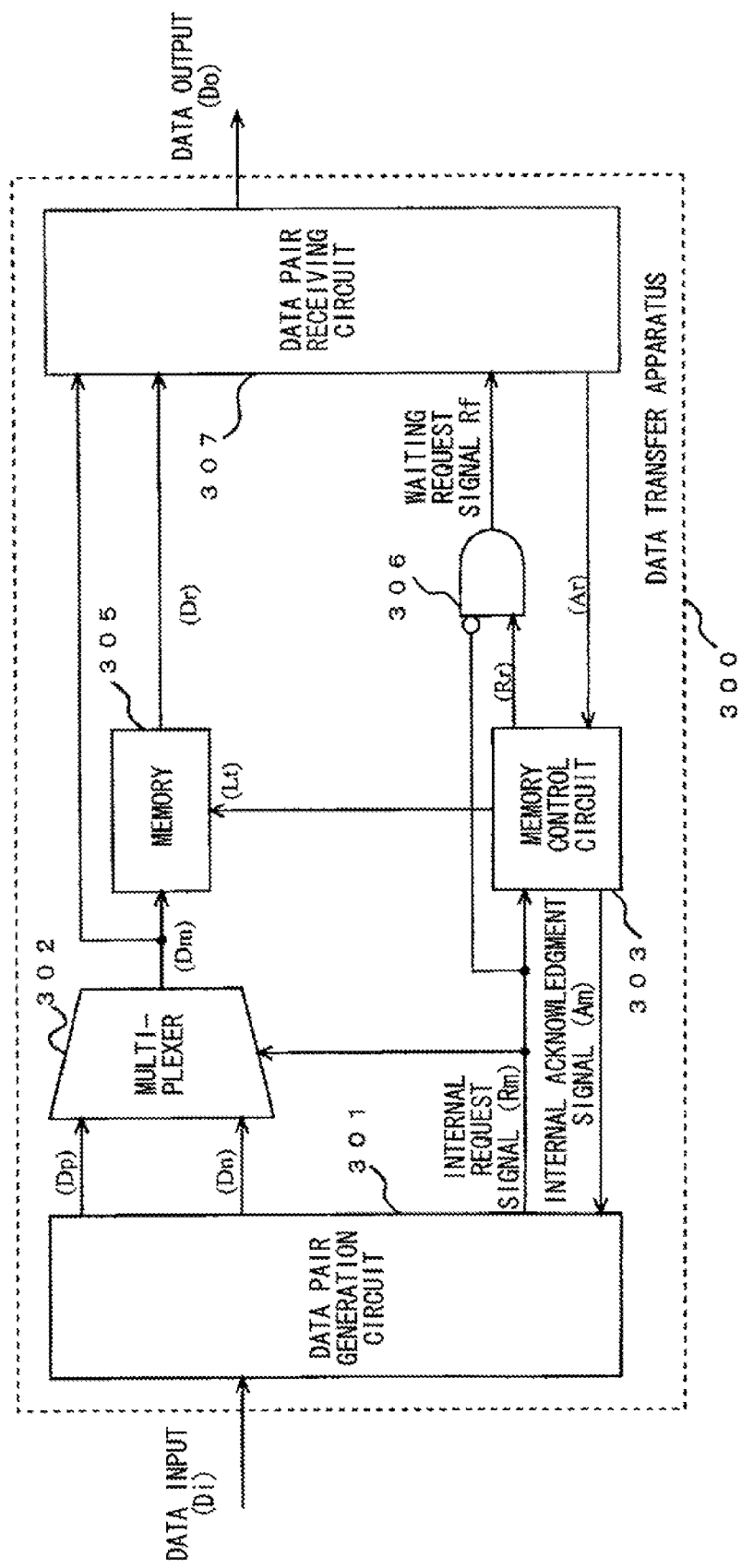
FIG. 11 is a diagram showing a configuration of a data transfer apparatus in which the pulse signal generation circuit is omitted.
Figure 12:
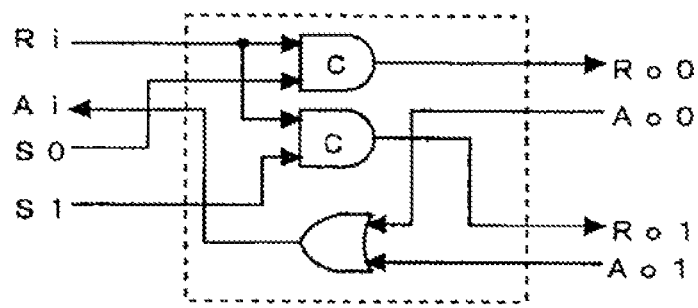
FIG. 12 is a diagram showing a configuration of a four-phase selection circuit.
Figure 13:
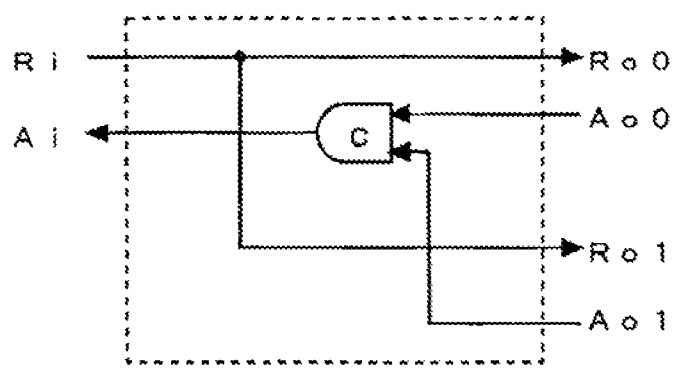
FIG. 13 is a diagram showing a configuration of a four-phase distribution circuit.
Figure 14:
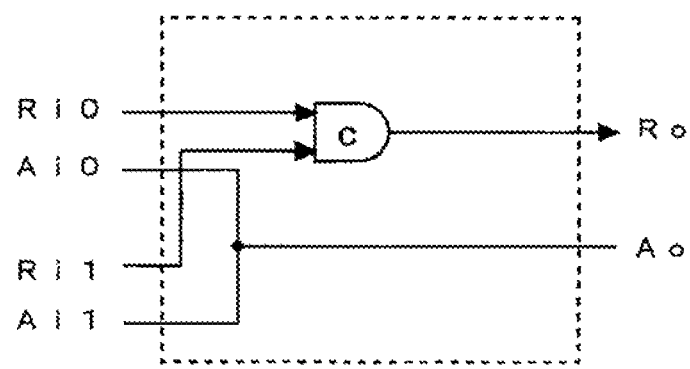
FIG. 14 is a diagram showing a configuration of a four-phase waiting circuit.
Figure 15:
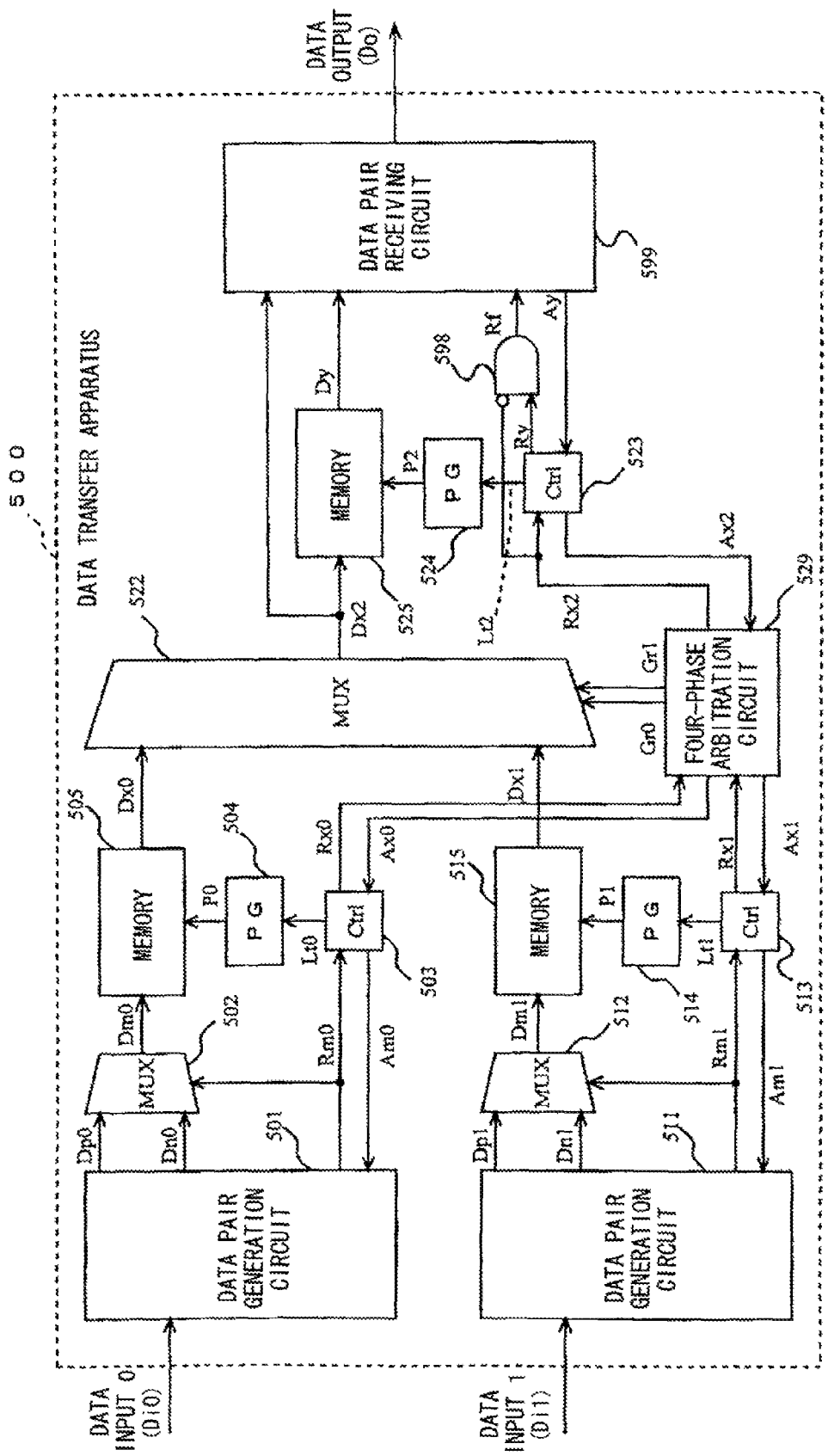
FIG. 15 is a block diagram showing a configuration of a data transfer apparatus according to a second exemplary embodiment that preferably practices the present invention.
Figure 16:
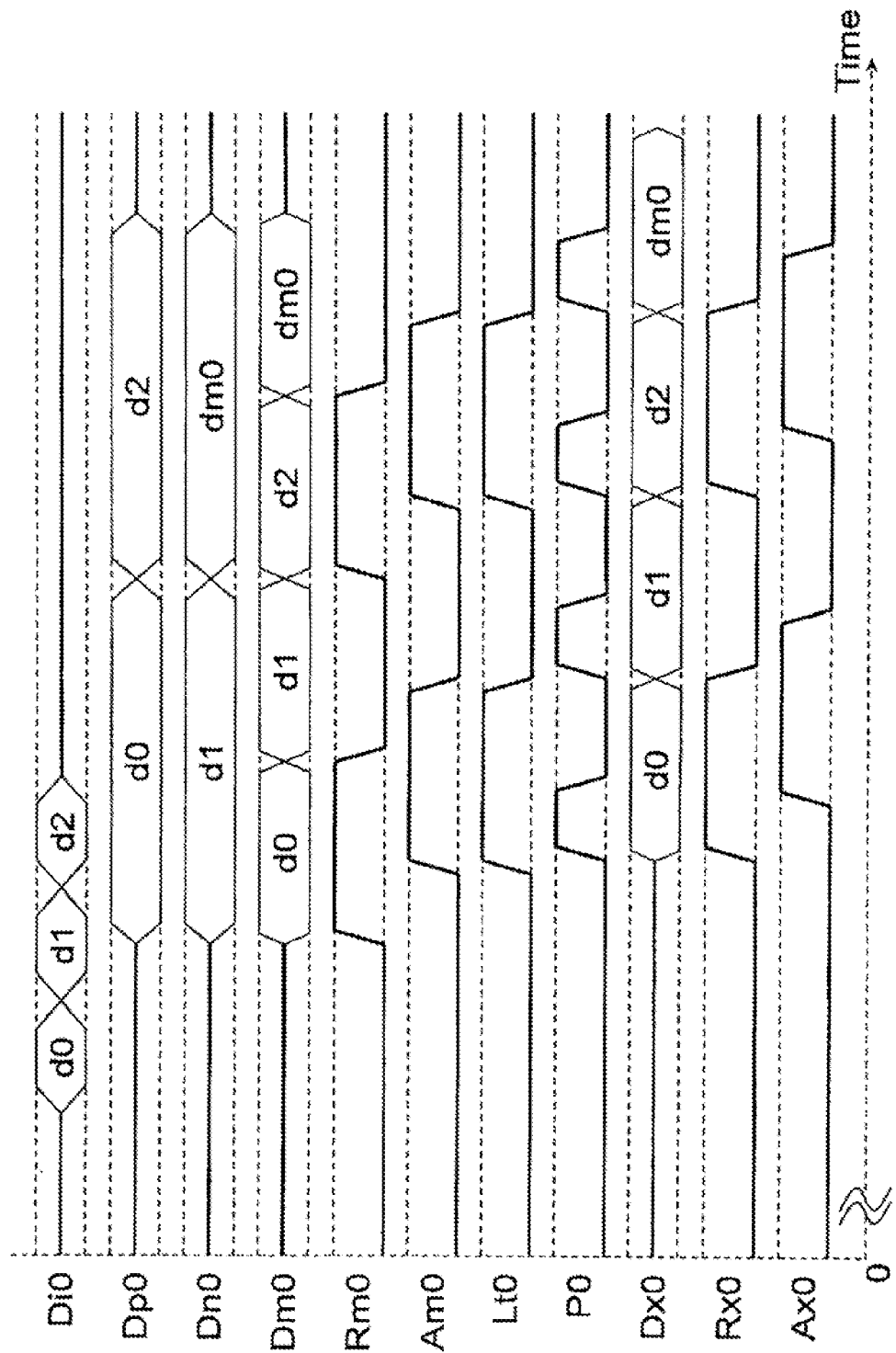
FIG. 16 is a waveform chart illustrating an operation of a data pair generation circuit in an example of the invention.
Figure 17:
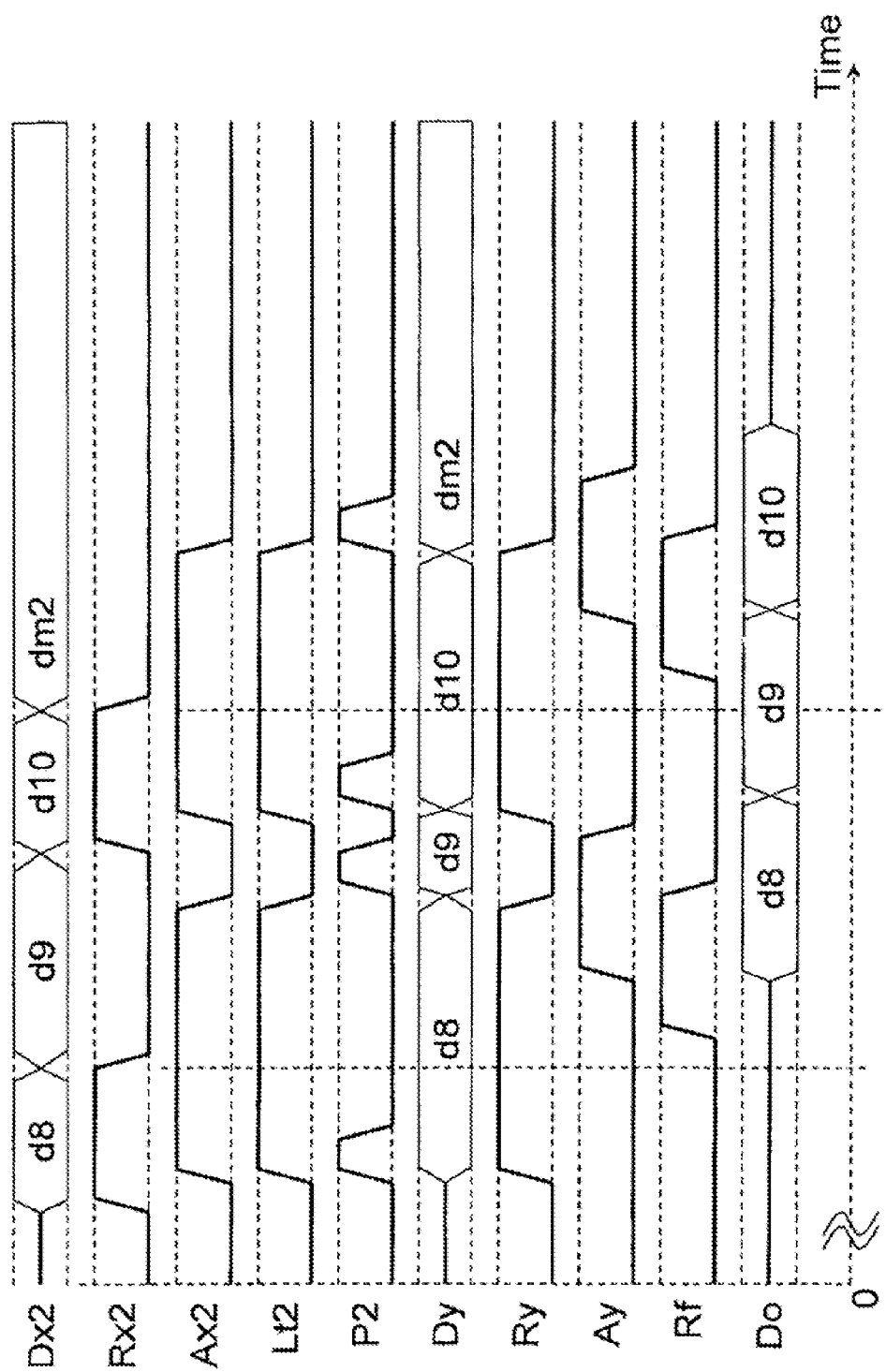
FIG. 17 is a waveform chart illustrating an operation of a data pair receiving circuit in an example of the invention.
Figure 18:
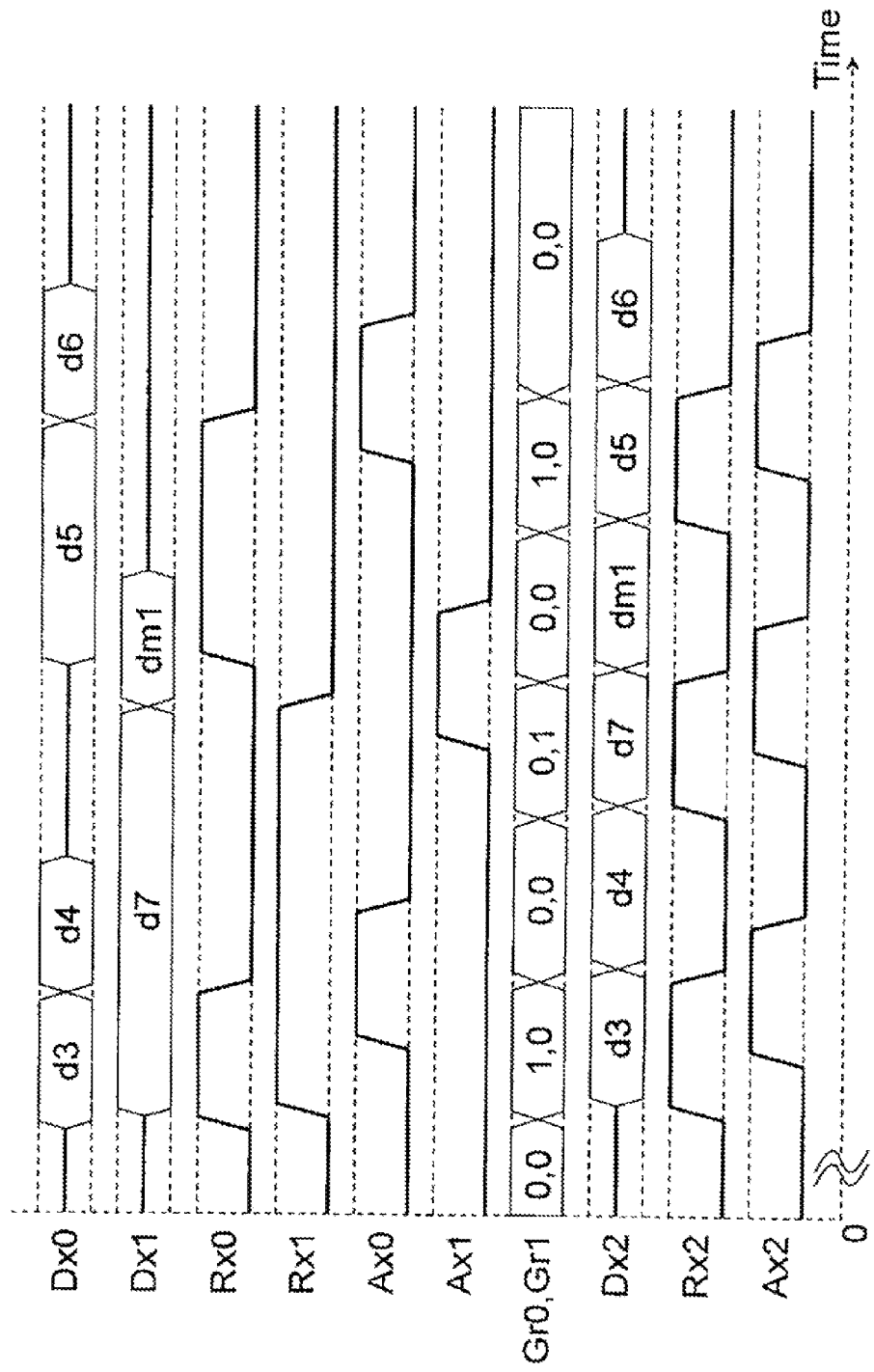
FIG. 18 is a waveform chart illustrating an operation of a four-phase arbitration circuit in an example of the invention.
Figure 19:
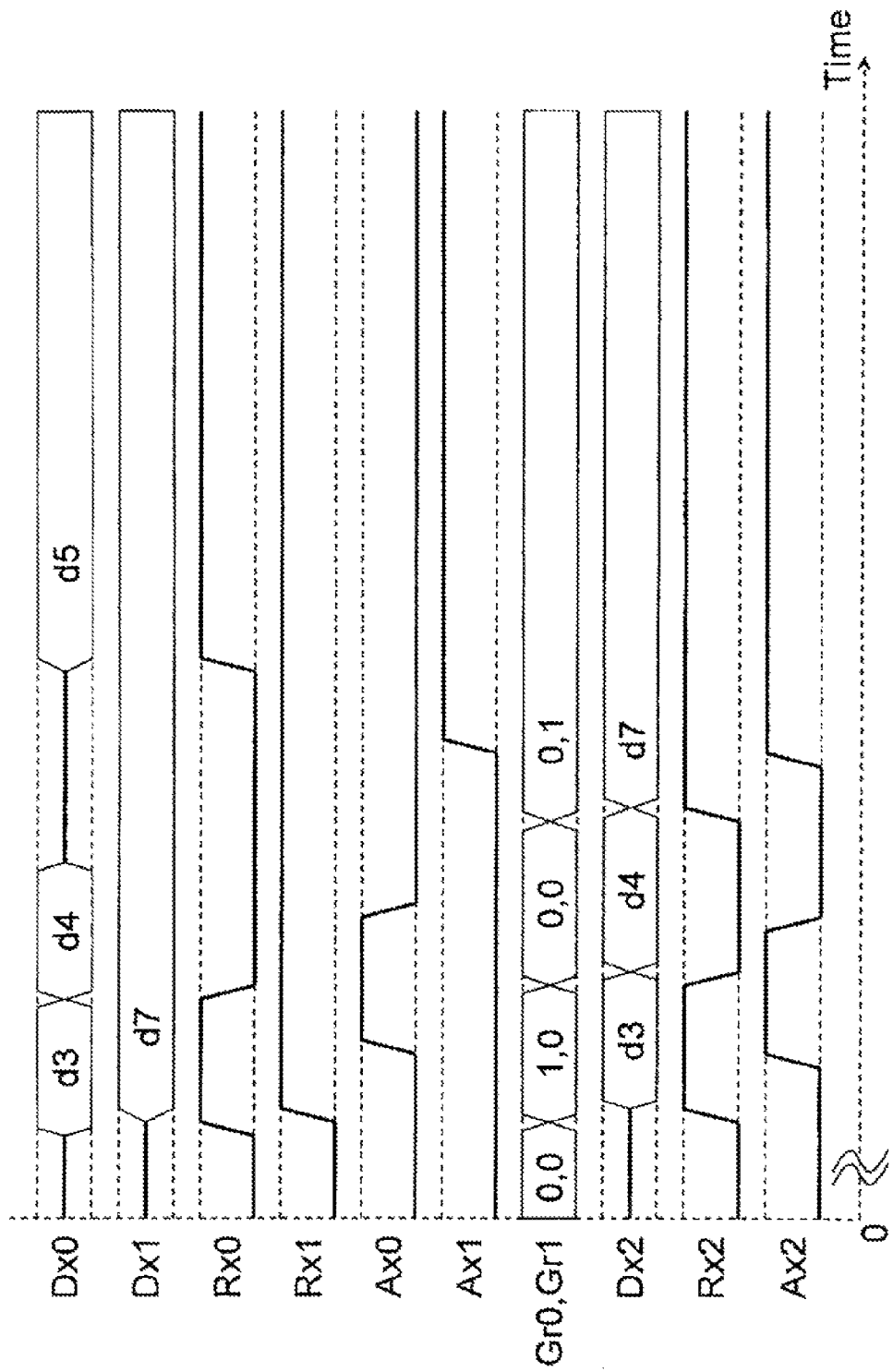
FIG. 19 is a waveform chart illustrating a stopping operation of the four-phase arbitration circuit without the data pair generation circuit in an example of the invention.
Figure 20:
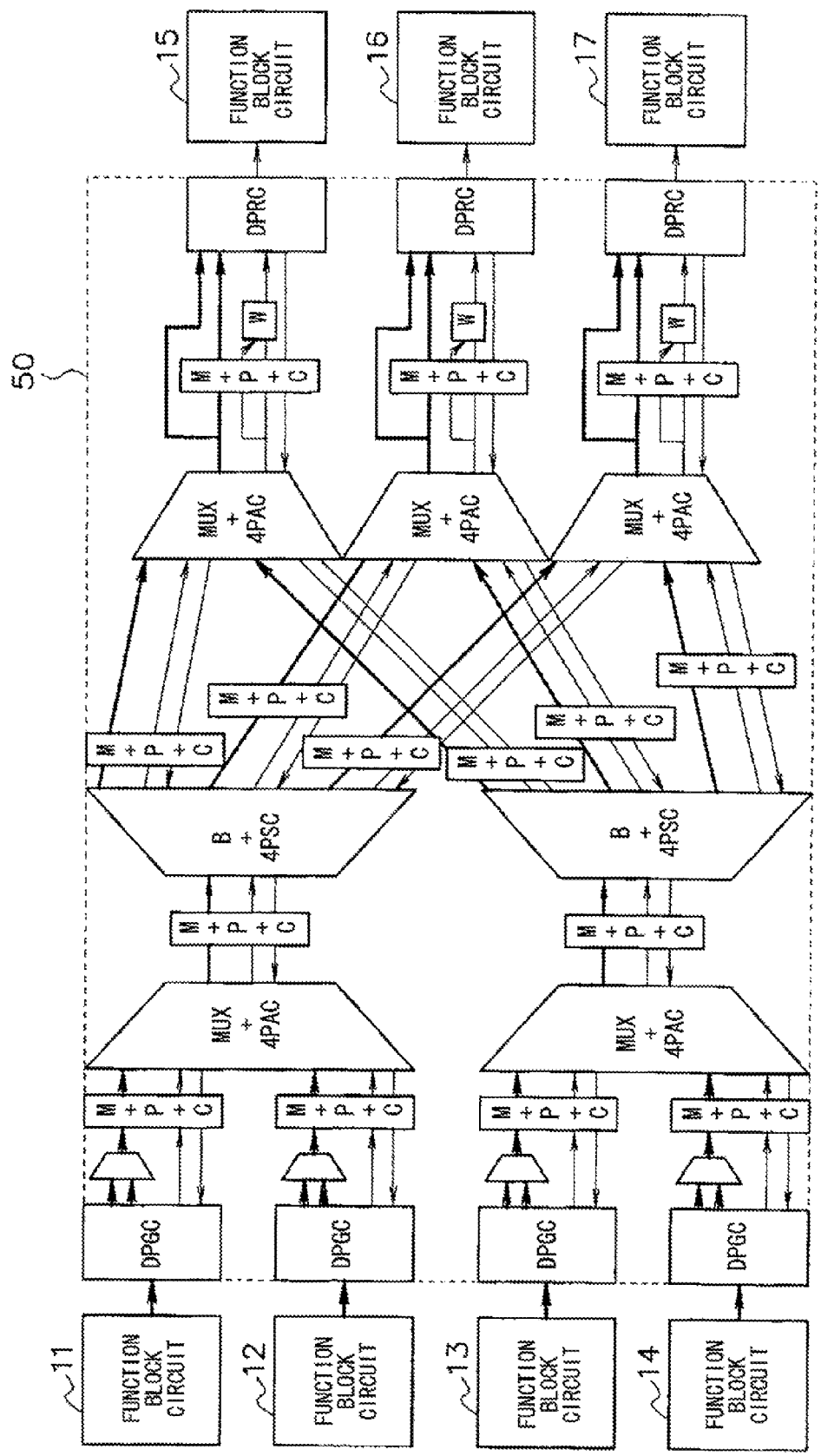
FIG. 20 is a diagram showing a configuration of a semiconductor device according to a third exemplary embodiment that preferably practices the invention.

100 Arbitration Circuit for Four-Phase Type Handshake Signal Communication
110 Mutual Exclusion Module
111 First-Arrival Signal Selection Module
112 Wrong Signal Propagation Prevention Module
120 Preceding Handshake Completion Module
130 Output Request Signal Generation Module
140 Output Acknowledgment Signal Generation Module
200, 601 Muller's C Element
202 Operation Table of C Element
300, 500 Data Transfer Apparatus
301, 501, 511 Data Pair Generation Circuit
302, 502, 512, 522 Multiplexer
303, 503, 513, 523 Memory Control Circuit
304, 504, 514, 524 Pulse Signal Generation Circuit
305, 505, 515, 525 Memory
306, 598 Request Signal Waiting Circuit
307, 599 Data Pair Receiving Circuit
529 Four-Phase Arbitration Circuit
600 Memory Control Circuit
601a 3-Input Majority Decision Cell
601b Feedback Loop
602 Buffer
700 Pulse Generation Circuit
701 EXCLUSIVE OR (XOR) Cell
702 Delay Cell

The invention claimed is:

1. A data transfer apparatus that performs data transfer from a transfer source to a transfer destination comprising:
    a data pair generation circuit that generates a data pair by making the number of transfer data items even by adding an odd number of dummy data items to the data items and pairing the even number of transfer data items, when the number of data items that are requested to transfer is odd, and outputs the generated data pair in accordance with a communication period of a handshake signal;
    a multiplexer that outputs one of the data pair in response to the handshake signal;
    a memory that stores the data output from the multiplexer in response to transitions of both a rising edge and a falling edge of a memory control input signal;
    a memory control circuit that performs a handshake signal communication based on a four-phase type handshake protocol and outputs a memory control signal to control the memory;
    a waiting circuit that outputs a request signal on condition that one of the data pair is stored in the memory and the other data is output from the multiplexer; and
    a data pair receiving circuit that receives the data pair from the multiplexer and the memory in response to the request signal and outputs the received data pair to the transfer destination;
    wherein the memory includes at least one of a level drive type latch and an edge drive type flip-flop, and
    the data transfer apparatus further comprises a pulse generation circuit that performs storage operation of the data in the memory by generating a pulse signal having a predetermined duration in response to transitions of both a rising edge and a falling edge of the memory control signal input, and by outputting the pulse signal to the memory.

2. The data transfer apparatus according to claim 1, wherein the memory control circuit includes a waiting element that shifts a timing of a rising edge or a falling edge of the memory control signal by waiting for the request signal and an input acknowledgment signal that are supplied to the memory control circuit according to the four-phase type handshake protocol.

3. The data transfer apparatus according to claim 2, wherein the waiting element includes a symmetrical 2-input C element.

4. The data transfer apparatus according to claim 3, wherein the symmetrical 2-input C element includes:
    a combinational logic circuit that achieves a 3-variable majority logic function; and
    a feedback circuit that connects an output terminal of the combinational logic circuit to one of input terminals of the combinational logic circuit.

5. The data transfer apparatus according to claim 1, wherein the pulse generation circuit includes a logic circuit that performs EXCLUSIVE-OR operation of the memory control signal that is an input signal.

6. The data transfer apparatus according to claim 1, wherein the pulse generation circuit includes a branch circuit that branches an input signal into a plurality of branch signals, a delay circuit that receives one of the branch signals, and a logic circuit that receives the rest of the branch signals and an output of the delay circuit and performs EXCLUSIVE-OR operation.

7. The data transfer apparatus according to claim 6, wherein a delay time of an output signal of the delay circuit relative to an input signal of the delay circuit is less than both a delay time of an input request signal relative to an output acknowledgment signal of the memory control circuit and a delay time of an input acknowledgment signal relative to an output request signal of the memory control circuit.

8. The data transfer apparatus according to claim 1, wherein the waiting circuit includes a logic circuit that performs NOT operation of an output request signal supplied from the memory control circuit and the request signal supplied to the memory control circuit, and a logic circuit that performs AND operation.

9. The data transfer apparatus according to claim 1, further comprising at least one four-phase arbitration circuit that includes a plurality of request signal input terminals, a request signal output terminal, acknowledgment signal output terminals as many as the request signal input terminals, and an acknowledgment signal input terminal,
wherein the four-phase arbitration circuit determines an output order of a second request signal that is output in response to first request signals and outputs the second request signal from the request signal output terminal in the determined output order when the first request signals are supplied from the request signal input terminals, outputs second acknowledgment signals from the acknowledgment signal output terminals corresponding to output sources of the first request signals based on which a first acknowledgment signal is received, upon receiving the first acknowledgment signal through the acknowledgment signal input terminal, and outputs a plurality of input data items to one output destination in order, the plurality of input data items being supplied to data signal lines provided in parallel in its own device.

10. The data transfer apparatus according to claim 1, further comprising at least one four-phase selection circuit that includes a request signal input terminal, a plurality of request signal output terminals, an acknowledgment signal output terminal, acknowledgment signal input terminals as many as the request signal output terminals, and destination information input terminals,
wherein the four-phase selection circuit selects one of the request signal output terminals based on destination information and outputs a fourth request signal from the selected terminal when a third request signal is supplied from the request signal input terminal, and outputs a fourth acknowledgment signal from the acknowledgment signal output terminal, upon receiving third acknowledgment signals corresponding to the fourth request signal through the acknowledgment signal input terminals corresponding to the selected request signal output terminal, and outputs input data to one of a plurality of output destination candidates of data output destinations, the input data being supplied to data signal lines provided in parallel in its own device.

11. The data transfer apparatus according to claim 1, further comprising at least one four-phase distribution circuit that includes a request signal input terminal, a plurality of request signal output terminals, an acknowledgment signal output terminal, and acknowledgment signal input terminals as many as the request signal output terminals,
wherein the four-phase distribution circuit outputs a sixth request signal from all of the request signal output terminals upon receiving a fifth request signal through the request signal input terminal, outputs a sixth acknowledgment signal from the acknowledgment signal output terminal upon receiving fifth acknowledgment signals from all of the acknowledgment signal input terminals, and outputs input data to all of the a plurality of output destination candidates, the input data being supplied to data signal lines provided in parallel in its own device.

12. The data transfer apparatus according to claim 1, further comprising at least one four-phase waiting circuit that includes a plurality of request signal input terminals, a request signal output terminal, acknowledgment signal output terminals as many as the request signal input terminals, and an acknowledgment signal input terminal,
wherein the four-phase waiting circuit outputs an eighth request signal from the request signal output terminal upon receiving a seventh request signal from all of the request signal input terminals, outputs an eighth acknowledgment signal from all of the acknowledgment signal output terminals upon receiving a seventh acknowledgment signal through the acknowledgment signal input terminal, waits for a plurality of input data items that are supplied to data signal lines provided in parallel in the own device, and outputs them to one output destination.

13. A semiconductor circuit comprising the data transfer apparatus according to claim 1.

14. A data transfer method that performs a data transfer from a transfer source to a transfer destination, the data transfer method comprising:
making the number of transfer data items even by adding an odd number of dummy data items to the data when the number of data items that are requested to transfer is odd;
generating a data pair by pairing the even number of transfer data items;
outputting one of the generated data pair from a multiplexer in accordance with a communication period of a handshake signal;
storing the data to a memory in response to transitions both a rising edge and a falling edge of a memory control input signal, the data being output in accordance with the communication period of the handshake signal;
performing a handshake signal communication based on a four-phase type handshake protocol and outputting a memory control signal to control the memory;
outputting a request signal on condition that one of the data pair is stored at the memory and the other data is output from the multiplexer; and
receiving the data pair from the multiplexer and the memory in response to the request signal and outputting the received data pair to the transfer destination;
wherein the memory includes at least one of a level drive type latch and an edge drive type flip-flop, and the data transfer method performs storage operation of the data in the memory by generating a pulse signal having a predetermined duration in response to transitions of both a rising edge and a falling edge of the memory control signal input and outputting the pulse signal to the memory.

15. The data transfer method according to claim 14, further comprising shifting a timing of a rising edge or a falling edge of the memory control signal by waiting for the request signal and an input acknowledgment signal that are supplied to a circuit that generates the memory control signal according to the four-phase type handshake protocol.

16. The data transfer method according to claim 14, wherein EXCLUSIVE-OR operation of the memory control signal that is an input signal is performed upon generating the pulse signal.

17. The data transfer method according to claim 14, wherein an input signal is branched into a plurality of branch signals, one of the branch signals is delayed, and EXCLUSIVE-OR operation of the rest of the branch signals and the delayed branch signal is performed upon generating the pulse signal.

18. The data transfer method according to claim 14, wherein a delay time of a signal obtained after the EXCLUSIVE-OR operation relative to the input signal is less than both a delay time of an input request signal relative to an output acknowledgment signal of a circuit that generates the memory control signal and a delay time of an input acknowledgment signal relative to an output request signal of the circuit that generates the memory control signal.

19. The data transfer method according to claim 14, wherein NOT operation and AND operation of an output request signal supplied from a circuit that generates the memory control signal and the request signal supplied to the circuit that generates the memory control signal are performed upon outputting the request signal.

20. The data transfer method according to claim 14, wherein a four-phase arbitration control is performed so as to output a plurality of input data items that are supplied to data signal lines provided in parallel, to one output destination in order by determining an output order of a second request signal that is output in accordance with each first request signal and outputting the second request signal from one request signal output terminal in the determined output order when first request signals are supplied from request signal input terminals, by outputting a second acknowledgment signal from an acknowledgment signal output terminal which corresponds to an output source of a first request signal and based on which a first acknowledgment signal is received, among the acknowledgment signal output terminals as many as the request signal input terminals, upon receiving the first acknowledgment signal through one acknowledgment signal input terminal.

* * * * *